US007439308B2

United States Patent
Ohno et al.

(10) Patent No.: US 7,439,308 B2
(45) Date of Patent: Oct. 21, 2008

(54) PROCESS FOR PRODUCING (METH)ACRYLIC POLYMER TERMINATED BY CROSSLINKABLE SILYL GROUP

(75) Inventors: Shigeki Ohno, Settsu (JP); Yoshiki Nakagawa, Settsu (JP); Kenichi Kitano, Settsu (JP); Masanao Takeda, Settsu (JP); Nao Fujita, Settsu (JP)

(73) Assignee: Kaneka Corporation, Osaka (JP)

( * ) Notice: Subject to any disclaimer, the term of this patent is extended or adjusted under 35 U.S.C. 154(b) by 149 days.

(21) Appl. No.: 10/506,103

(22) PCT Filed: Apr. 18, 2003

(86) PCT No.: PCT/JP03/05018

§ 371 (c)(1), (2), (4) Date: Aug. 31, 2004

(87) PCT Pub. No.: WO03/091291

PCT Pub. Date: Nov. 6, 2003

(65) Prior Publication Data

US 2005/0107547 A1    May 19, 2005

(30) Foreign Application Priority Data

Apr. 25, 2002    (JP)    ............ 2002-123400

(51) Int. Cl.
*C08F 20/02*    (2006.01)
*C08C 19/25*    (2006.01)
*C08C 2/04*    (2006.01)

(52) U.S. Cl. ............ 525/329.7; 525/330.1; 525/330.3; 525/342; 528/480; 528/481

(58) Field of Classification Search ............ 525/329.7, 525/330.1, 330.3, 342; 528/480, 481
See application file for complete search history.

(56) References Cited

U.S. PATENT DOCUMENTS

| | | | |
|---|---|---|---|
| 6,303,728 B1 | 10/2001 | Hagimori et al. | ............ 528/15 |
| 6,552,118 B2 * | 4/2003 | Fujita et al. | ............ 524/588 |
| 2003/0181634 A1 * | 9/2003 | Kitano et al. | ............ 528/482 |
| 2004/0029990 A1 | 2/2004 | Fujita et al. | |

FOREIGN PATENT DOCUMENTS

| | | |
|---|---|---|
| EP | 1 197 498 A1 | 4/2002 |
| EP | 1 288 230 A1 | 3/2003 |
| EP | 1 00 979 A1 | 5/2004 |
| EP | 1 449 855 A1 | 8/2004 |
| JP | 2000-128924 | 5/2000 |
| JP | 2001-206908 | 7/2001 |
| JP | 2001-240617 | 9/2001 |
| WO | WO 99/05215 | * 2/1999 |
| WO | WO 01/85804 | * 11/2001 |
| WO | WO 01/85804 A1 | 11/2001 |

OTHER PUBLICATIONS

European Supplemental Search Report dated Nov. 5, 2007, EP 03719143.

* cited by examiner

*Primary Examiner*—Roberto Rábago
(74) *Attorney, Agent, or Firm*—Kenyon & Kenyon LLP

(57) ABSTRACT

A method for producing a (meth)acrylic polymer having crosslinkable silyl groups at the termini, comprising a step of adding a hydrosilane compound having a crosslinkable silyl group to an alkenyl-terminated (meth)acrylic polymer (A), which is prepared by atom transfer radical polymerization, in the presence of a platinum hydrosilylation catalyst. The amount of the platinum hydrosilylation catalyst is 0.1 to 10 mg on a platinum metal basis per kilogram of the alkenyl-terminated (meth)acrylic polymer (A). An object of the invention is to provide a method for producing a (meth)acrylic polymer having terminal crosslinkable silyl.

22 Claims, No Drawings

PROCESS FOR PRODUCING (METH)ACRYLIC POLYMER TERMINATED BY CROSSLINKABLE SILYL GROUP

This application is a 371 national phase application of PCT/JP03/05018 filed on 18 Apr. 2003, claiming priority to JP 2002-123400, filed on 25 Apr. 2002, the contents of which are incorporated herein by reference in their entirety.

TECHNICAL FIELD

The present invention relates to a method for producing a (meth)acrylic polymer having crosslinkable silyl groups at the termini by atom transfer radical polymerization, and to a polymer and a curable composition prepared by this method.

BACKGROUND ART

When (meth)acrylic polymers having crosslinkable silyl groups at the termini are crosslinked, crosslinked materials having crosslinked sites at the termini of the polymers are produced as a result. Thus, (meth)acrylic polymers having crosslinkable silyl groups at the termini can be used to form elastic materials having large molecular weights between crosslinks.

These polymers can be used as highly weather-resistant materials and are particularly suitable for use in materials requiring rubber elasticity, such as sealants and adhesives.

Examples of methods for producing (meth)acrylic polymers having terminal crosslinkable silyl groups include a method disclosed in Japanese Examined Patent Application Publication No. 3-14068 in which a (meth)acrylic monomer is polymerized in the presence of a mercaptan containing a crosslinkable silyl group, a disulfide containing a crosslinkable silyl group, and a radical polymerization initiator containing a crosslinkable silyl group; and a method disclosed in Japanese Examined Patent Application Publication No. 4-55444 in which an acrylic monomer is polymerized in the presence of a hydrosilane compound containing a crosslinkable silyl group, or tetrahalosilane. Japanese Unexamined Patent Application Publication No. 6-211922 discloses a method for producing an acrylic polymer having terminal crosslinkable silyl groups, characterized in that a large amount of a hydroxyl-containing polysulfide relative to an initiator is used to synthesize an acrylic polymer having terminal hydroxyl groups, followed by conversion of the hydroxyl groups. Japanese Unexamined Patent Application Publication No. 5-97921 discloses a method for producing an acrylic polymer containing terminal crosslinkable silyl groups, including the steps of anionically polymerizing an acrylic monomer in the presence of a stabilized carbanion containing a crosslinkable silyl group and then reacting the termini of the polymer with a bifunctional electrophilic compound.

However, the above-described methods require particular functionalizing agents and thus have poor economic efficiency and problems relating to equipment. Moreover, in these methods, a heteroatom will be introduced into the polymer main chain skeleton. This is a problem since high heat resistance and high weather resistance of the (meth)acrylic polymer will no longer be achieved.

Atom transfer radical polymerization (hereinafter, ATRP), which is a type of living radical polymerization, is a useful method for producing (meth)acrylic polymers having functional groups (for example, refer to Matyjaszewski, et al., J. Am. Chem. Soc. 1995, vol. 117, p. 5614; Macromolecules, 1995, vol. 28, p. 7901, Science 1996, vol. 272, p. 866; and Sawamoto, et al., Macromolecules 1995, vol. 28, p. 1721).

The ATRP may be employed to produce a (meth)acrylic polymer having terminal crosslinkable silyl groups. The present inventors have developed methods including the steps of preparing a halogen-terminated (meth)acrylic polymer by ATRP, converting the terminal halogen groups into alkenyl-containing substituents, and converting the alkenyl groups into substituents containing crosslinkable silyl groups (Japanese Unexamined Patent Application Publication Nos. 09-272714, 11-043512, 11-080250, and 2000-44626). Cured products having satisfactory characteristics can be produced by these methods since the functional groups can be reliably introduced to the termini of the polymers.

An example of a method for converting alkenyl groups into substituents containing crosslinkable silyl groups is hydrosilylation by which a hydrosilane compound containing a crosslinkable silyl group is added to the alkenyl groups. The hydrosilylation is preferably conducted in the presence of a transition metal complex functioning as a reaction catalyst to simplify the process.

DISCLOSURE OF INVENTION

The present inventors have found that the polymerization catalyst used in the above-described ATRP acts as a catalyst poison during the hydrosilylation reaction of the present invention. When the polymerization catalyst (catalyst poison) remains in the alkenyl-terminated polymer, large amounts of a hydrosilylation catalyst (such as a platinum complex) would be necessary to conduct hydrosilylation of the alkenyl groups. However, the color of the hydrosilylation catalyst frequently turns brown, dark brown, or black after the hydrosilylation reaction. Thus, use of large amounts of hydrosilylation catalyst may result in strongly colored polymers and may thus degrade the quality of the resulting products. Moreover, typical hydrosilylation catalysts, i.e., platinum complexes, are expensive, and use of large amounts of such catalysts is not preferred from the economic standpoint, i.e., because the cost of materials will increase. Although, in general, the amount of hydrosilylation catalyst can be decreased by employing a high reaction temperature and a longer reaction time, these measures are not suitable for introducing crosslinkable silyl groups into the polymer termini by hydrosilylation. This is because a higher hydrosilylation reaction temperature and a longer reaction time frequently cause the terminal crosslinkable silyl groups to undergo a crosslinking reaction or decomposition, thereby degrading the quality of the resulting products. Furthermore, trace amounts of free acids, which are derived from the polymerization catalyst or the terminal halogen atoms in the polymer, may be present in the polymer synthesized by ATRP. The presence of free acids in the polymer tends to cause the crosslinkable silyl groups to react, and the quality of the resulting products is frequently degraded as a result.

In particular, the present invention has the following objectives (1) to (3):

(1) to decrease the amount of the hydrosilylation catalyst so that the coloring of the polymer is prevented;

(2) to decrease the amount of the hydrosilylation catalyst so that an economically advantageous method can be established; and (3) to prevent degradation of the quality of the products resulting from the reaction of the terminal crosslinkable silyl groups under hydrosilylation reaction conditions.

The present invention relates to a method for producing a (meth)acrylic polymer having terminal crosslinkable silyl groups, comprising a step of mixing components (A) to (C) below to carry out hydrosilylation reaction:
(A) an alkenyl-terminated (meth)acrylic polymer prepared by atom transfer radical polymerization and containing 10 mg or less of a transition metal per kilogram of the polymer and 500 mg or less of a halogen per kilogram of the polymer;
(B) a hydrosilane compound having a crosslinkable silyl group; and
(C) a platinum catalyst.

The amount of the transition metal in the polymer (A) is preferably 3 mg or less per kilogram of the polymer (A). The amount of the halogen in the polymer (A) is preferably 300 mg or less per kilogram of the polymer (A). The amount of the platinum catalyst (C) is preferably 0.1 to 30 mg and more preferably 0.5 to 10 mg on a platinum metal basis per kilogram of polymer (A).

The hydrosilylation reaction is preferably performed in the presence of a hydrolyzable ester compound (in particular, trialkyl orthoformate) and/or an alkyl alcohol preferably in an inert gas atmosphere such as nitrogen gas. The hydrosilylation reaction temperature is preferably 50 to 150° C. and more preferably 70 to 120° C. In some cases, a hydrosilane compound (B) having a crosslinkable silyl group is preferably supplied in portions. Methyldimethoxysilane is preferred as the hydrosilane compound (B) having a crosslinkable silyl group. The platinum catalyst (C) is preferably a platinum(0)-1,1,3,3-tetramethyl-1,3-divinyldisiloxane complex.

The present invention also relates to the above-described method for producing the (meth)acrylic polymer having terminal crosslinkable silyl groups, characterized in that the polymer (A) is prepared by the following steps (1) to (3):
(1) polymerizing a (meth)acrylic monomer in the presence of a transition metal complex functioning as a catalyst and one of an organohalide compound and a sulfonyl halide compound functioning as an initiator, thereby producing a halogen-terminated (meth)acrylic polymer;
(2) reacting the halogen groups with a compound having a plurality of alkenyl groups in the molecule; and
(3) carrying out a dehalogenation reaction by heating. The halogen is preferably selected from the group consisting of chlorine, bromine, and iodine.

The (meth)acrylic polymer is preferably a (meth)acrylic ester polymer and more preferably an acrylic ester polymer. In this invention, the compound having a plurality of alkenyl groups in the molecule is preferably a nonconjugated diene compound, more preferably an alkenyl-containing aliphatic hydrocarbon compound, and most preferably 1,7-octadiene.

In order to produce the (meth)acrylic polymer having terminal crosslinkable silyl groups on an industrial scale, the polymer (A) is preferably obtained by processing 100 kg or more of a polymer at a time. When polymer is processed on a large scale, large amounts of products can be obtained by one process. To increase the scale of production is industrially advantageous.

Atom transfer radical polymerization (ATRP) will now be described in detail.

In the present invention, ATRP refers to a type of living radical polymerization in which a vinyl monomer is radically polymerized in the presence of an organohalide or sulfonyl halide compound functioning as an initiator and a metal complex catalyst containing a transition metal as a central metal. According to ATRP, it is possible to control the molecular weight and the molecular weight distribution and to introduce halogen groups into the termini of the polymer. Thus, ATRP is the optimum method for producing a halogen-containing (meth)acrylic polymer. ATRP will now be described in further detail.

ATRP has been disclosed, for example, in the following publications: Matyjaszewski et al., J. Am. Chem. Soc., 1995, vol. 117, p. 5614; Macromolecules 1995, vol. 28, p. 7901; Science 1996, vol. 272, p. 866; WO 96/30421; WO 97/18247; WO98/01480; WO98/40415; Sawamoto et al., Macromolecules 1995, vol. 28, p. 1721; and Japanese Unexamined Patent Application Publication Nos. 9-208616 and 8-41117.

The ATRP of the present invention includes reverse ATRP. In reverse ATRP, a transition metal complex in a higher oxidation state is reacted with a conventional radical initiator, such as a peroxide, to produce an equilibrium similar to that of a normal ATRP. For example, the "transition metal complex in a higher oxidation state" is a Cu(II) complex, which is, in a normal ATRP, produced from a Cu(I) ATRP catalyst as a result of radical generation (refer to Macromolecules 1999, 32, 2872).

In this ATRP, for example, a sulfonyl halide compound or an organohalide compound, in particular, an organohalide compound containing a highly reactive carbon-halogen bond (e.g., a carbonyl compound having a halogen atom in the α position or a compound containing a halogen atom in the benzyl position), is used as the initiator. Examples of the initiator include the following:

$C_6H_5$—$CH_2X$, $C_6H_5$—$C(H)(X)CH_3$, and $C_6H_5$—$C(X)(CH_3)_2$ (wherein $C_6H_5$ represents a phenyl group, and X represents chlorine, bromine, or iodine);

$R^3$—$C(H)(X)$—$CO_2R^4$, $R^3$—$C(CH_3)(X)$—$CO_2R^4$, $R^3$—$C(H)(X)$—$C(O)R^4$, and $R^3$—$C(CH_3)(X)$—$C(O)R^4$ (wherein $R^3$ and $R^4$ each represent a hydrogen atom or a $C_1$-$C_{20}$ alkyl, aryl, or aralkyl group; and X represents chlorine, bromine, or iodine); and $R^3$—$C_6H_4$—$SO_2X$ (wherein $R^3$ represents a hydrogen atom or a $C_1$-$C_{20}$ alkyl, aryl, or aralkyl group; and X represents chlorine, bromine, or iodine).

ATRP of a (meth)acrylic monomer in the presence of an organohalide or sulfonyl halide compound functioning as an initiator produces a (meth)acrylic polymer having a terminal group represented by general formula (1):

$$—CH_2—C(R^1)(CO_2R^2)(X) \quad (1)$$

(wherein $R^1$ represents hydrogen or a methyl group; $R^2$ represents an ester-bonded group in a side chain of the (meth)acrylic monomer unit and; X represents chlorine, bromine, or iodine).

Alternatively, an organohalide compound or a sulfonyl halide compound having both a functional group that initiates the polymerization and a specific reactive functional group that does not initiate the polymerization may be used as the initiator for the ATRP. In such a case, a (meth)acrylic polymer containing the specific reactive functional group at one terminus of the main chain and the halogen-containing structure (1) at the other terminus of the main chain can be obtained. Examples of the specific reactive functional group include alkenyl, crosslinkable silyl, hydroxyl, epoxy, amino, and amide groups.

Examples of the alkenyl-containing organohalide compound include, but are not limited to, those represented by general formula (2):

$$R^6R^7C(X)—R^8—R^9—C(R^5)=CH_2 \quad (2)$$

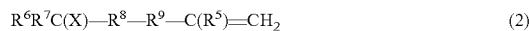

(wherein $R^5$ represents hydrogen or a methyl group; $R^6$ and $R^7$ each represent hydrogen or a monovalent $C_1$-$C_{20}$ alkyl, aryl, or aralkyl group and may be bonded with each other at the free termini; $R^8$ represents —C(O)O— (ester group), —C(O)— (keto group), or a o-, m-, or p-phenylene group; $R^9$ represents a direct bond or a divalent $C_1$-$C_{20}$ organic group which may contain at least one ether bond; and X represents chlorine, bromine, or iodine).

Examples of the substituents $R^6$ and $R^7$ include hydrogen, methyl, ethyl, n-propyl, isopropyl, butyl, pentyl, and hexyl. $R^6$ and $R^7$ may bond with each other at their free termini to form a ring structure.

Examples of the alkenyl-containing organohalide compound represented by general formula (2) include the following:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$, and

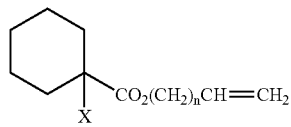

(wherein X represents chlorine, bromine, or iodine; and n represents an integer between 0 and 20);

$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$, and

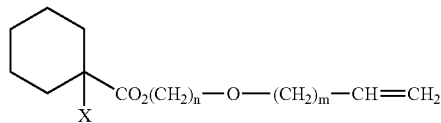

(wherein X represents chlorine, bromine, or iodine; n represents an integer between 1 and 20; and m represents an integer between 0 and 20);

o,m,p-$XCH_2$—$C_6H_4$—$(CH_2)$ n-$CH=CH_2$, o,m,p-$CH_3C(H)(X)$—$C_6H_4$—$(CH_2)_n$—$CH=CH_2$, and o,m,p-$CH_3CH_2C(H)(X)$—$C_6H_4$—$(CH_2)_n$—$CH=CH_2$ (wherein X represents chlorine, bromine, or iodine; and n represents an integer between 0 and 20);

o,m,p-$XCH_2$—$C_6H_4$—$(CH_2)_n$—O—$(CH_2)_m$—$CH=CH_2$, o,m,p-$CH_3C(H)(X)$—$C_6H_4$—$(CH_2)_n$—O—$(CH_2)_m$—$CH=CH_2$, and o,m,p-$CH_3CH_2C(H)(X)$—$C_6H_4$—$(CH_2)_n$—O—$(CH_2)_m$—$CH=CH_2$ (wherein X represents chlorine, bromine, or iodine; n represents an integer between 1 and 20; and m represents an integer between 0 and 20);

o,m,p-$XCH_2$—$C_6H_4$—O—$(CH_2)_n$—$CH=CH_2$, o,m,p-$CH_3C(H)(X)$—$C_6H_4$—O—$(CH_2)_n$—$CH=CH_2$, and o,m,p-$CH_3CH_2C(H)(X)$—$C_6H_4$—O—$(CH_2)_n$—$CH=CH_2$ (wherein X represents chlorine, bromine, or iodine; and n represents an integer between 0 and 20); and o,m,p-$XCH_2$—$C_6H_4$—O—$(CH_2)_n$—O—$(CH_2)_m$—$CH=CH_2$, o,m,p-$CH_3C(H)(X)$—$C_6H_4$—O—$(CH_2)_n$—O—$(CH_2)_m$—$CH=CH_2$, and o,m,p-$CH_3CH_2C(H)(X)$—$C_6H_4$—O—$(CH_2)_n$—O—$(CH_2)_m$—$CH=CH_2$ (wherein X represents chlorine, bromine, or iodine; n represents an integer between 1 and 20; and m represents an integer between 0 and 20).

Other examples of the alkenyl-containing organohalide compound are those represented by general formula (3):

$$H_2C=C(R^5)—R^9—C(R^6)(X)—R^{10}—R^7 \quad (3)$$

(wherein $R^5$, $R^6$, $R^7$, $R^9$, and X are the same as above; $R^{10}$ represents a direct bond, —C(O)O— (ester group), —C(O)— (keto group), or a o-, m-, or p-phenylene group).

$R^9$ is either a direct bond or a divalent $C_1$-$C_{20}$ organic group which may contain at least one ether bond. When $R^9$ is a direct bond, this compound is an allyl halide in which the carbon atom bonded to the halogen atom bonds to the vinyl group. In this compound, the carbon-halogen bond is activated by the vicinal vinyl group; thus, $R^{10}$ need not contain a C(O)O group, a phenylene group, or the like and may be a direct bond. When $R^9$ is not a direct bond, $R^{10}$ is preferably a C(O)O group, C(O) group, or a phenylene group to activate the carbon-halogen bond.

Examples of the compounds represented by general formula (3) include the following:

$CH_2=CHCH_2X$, $CH_2=C(CH_3)CH_2X$, $CH_2=CHC(H)(X)CH_3$, $CH_2=C(CH_3)C(H)(X)CH_3$, $CH_2=CHC(X)(CH_3)_2$, $CH_2=CHC(H)(X)C_2H_5$, $CH_2=CHC(H)(X)CH(CH_3)_2$, $CH_2=CHC(H)(X)C_6H_5$, $CH_2=CHC(H)(X)CH_2C_6H_5$, $CH_2=CHCH_2C(H)(X)$—$CO_2R$, $CH_2=CH(CH_2)_2C(H)(X)$—$CO_2R$, $CH_2=CH(CH_2)_3C(H)(X)$—$CO_2R$, $CH_2=CH(CH_2)_8C(H)(X)$—$CO_2R$, $CH_2=CHCH_2C(H)(X)$—$C_6H_5$, $CH_2=CH(CH_2)_2C(H)(X)$—$C_6H_5$, and $CH_2=CH(CH_2)_3C(H)(X)$—$C_6H_5$, (wherein X represents chlorine, bromine, or iodine; and R represents a $C_1$-$C_{20}$ alkyl group, aryl group, or aralkyl group).

Examples of the alkenyl-containing sulfonyl halide compound include the following:

o-,m-,p-$CH_2=CH$—$(CH_2)_n$—$C_6H_4$—$SO_2X$ and o-,m-,p-$CH_2=CH$—$(CH_2)_n$—O—$C_6H_4$—$SO_2X$, (wherein X represents chlorine, bromine, or iodine, and n represents an integer between 0 and 20).

Examples of the above-described organohalide compound having a crosslinkable silyl group include, but are not limited to, those represented by general formula (4):

$$R^6R^7C(X)—R^8—R^9—C(H)(R^5)CH_2—[Si(R^{11})_{2-b}(Y)_bO]_m—Si(R^{12})_{3-a}(Y)_a \quad (4)$$

(wherein $R^5$, $R^6$, $R^7$, $R^8$, $R^9$, and X are the same as above; $R^{11}$ and $R^{12}$ each represent a $C_1$-$C_{20}$ alkyl, aryl, or aralkyl group or a triorganosiloxy group represented by $(R')_3SiO$— (wherein R's each represent a monovalent $C_1$-$C_{20}$ hydrocarbon group and may be the same or different); when two or more $R^{11}$s or $R^{12}$s are present, they may be the same or different; Y represents a hydroxyl group or a hydrolyzable group; when two or more Ys are present, they may be the same or different; a represents 0, 1, 2, or 3; b represents 0, 1, or 2; m represents an integer between 0 and 19; and a+mb≧1).

Examples of the compounds represented by general formula (4) include the following:

$XCH_2C(O)O(CH_2)_nSi(OCH_3)_3$, $CH_3C(H)(X)C(O)O(CH_2)_nSi(OCH_3)_3$, $(CH_3)_2C(X)C(O)O(CH_2)_nSi(OCH_3)_3$, $XCH_2C(O)O(CH_2)_nSi(CH_3)(OCH_3)_2$, $CH_3C(H)(X)C(O)O(CH_2)_nSi(CH_3)(OCH_3)_2$, and $(CH_3)_2C(X)C(O)O(CH_2)_nSi(CH_3)(OCH_3)_2$, (wherein X is chlorine, bromine, or iodine; and n is an integer between 0 and 20);

XCH$_2$C(O)O(CH$_2$)$_n$O(CH$_2$)$_m$Si(OCH$_3$)$_3$,
H$_3$CC(H)(X)C(O)O(CH$_2$)$_n$O(CH$_2$)$_m$Si(OCH$_3$)$_3$,
(H$_3$C)$_2$C(X)C(O)O(CH$_2$)$_n$O(CH$_2$)$_m$Si(OCH$_3$)$_3$,
CH$_3$CH$_2$C(H)(X)C(O)O(CH$_2$)$_n$O(CH$_2$)$_m$Si(OCH$_3$)$_3$,
XCH$_2$C(O)O(CH$_2$)$_n$O(CH$_2$)$_m$Si(CH$_3$)(OCH$_3$)$_2$,
H$_3$CC(H)(X)C(O)O(CH$_2$)$_n$O(CH$_2$)$_m$—Si(CH$_3$)(OCH$_3$)$_2$,
(H$_3$C)$_2$C(X)C(O)O(CH$_2$)$_n$O(CH$_2$)$_m$—Si(CH$_3$)(OCH$_3$)$_2$, and
CH$_3$CH$_2$C(H)(X)C(O)O(CH$_2$)$_n$O(CH$_2$)$_m$—Si(CH$_3$)
(OCH$_3$)$_2$, (wherein X represents chlorine, bromine, or iodine; n represents an integer between 1 and 20; and m represents an integer between 0 and 20); and o,m,p-XCH$_2$—C$_6$H$_4$—(CH$_2$)$_2$Si(OCH$_3$)$_3$,
o,m,p-CH$_3$C(H)(X)—C$_6$H$_4$—(CH$_2$)$_2$Si(OCH$_3$)$_3$,
o,m,p-CH$_3$CH$_2$C(H)(X)—C$_6$H$_4$—(CH$_2$)$_2$Si(OCH$_3$)$_3$,
o,m,p-XCH$_2$—C$_6$H$_4$—(CH$_2$)$_3$Si(OCH$_3$)$_3$,
o,m,p-CH$_3$C(H)(X)—C$_6$H$_4$—(CH$_2$)$_3$Si(OCH$_3$)$_3$,
o,m,p-CH$_3$CH$_2$C(H)(X)—C$_6$H$_4$—(CH$_2$)$_3$Si(OCH$_3$)$_3$,
o,m,p-XCH$_2$—C$_6$H$_4$—(CH$_2$)$_2$—O—(CH$_2$)$_3$Si(OCH$_3$)$_3$,
o,m,p-CH$_3$C(H)(X)—C$_6$H$_4$—(CH$_2$)$_2$—O—(CH$_2$)$_3$Si (OCH$_3$)$_3$,
o,m,p-CH$_3$CH$_2$C(H)(X)—C$_6$H$_4$—(CH$_2$)$_2$—O—(CH$_2$)$_3$Si (OCH$_3$)$_3$,
o,m,p-XCH$_2$—C$_6$H$_4$—O—(CH$_2$)$_3$Si(OCH$_3$)$_3$,
o,m,p-CH$_3$C(H)(X)—C$_6$H$_4$—O—(CH$_2$)$_3$Si(OCH$_3$)$_3$,
o,m,p-CH$_3$CH$_2$C(H)(X)—C$_6$H$_4$—O—(CH$_2$)$_3$—Si(OCH$_3$)$_3$,
o,m,p-XCH$_2$—C$_6$H$_4$—O—(CH$_2$)$_2$—O—(CH$_2$)$_3$—Si (OCH$_3$)$_3$,
o,m,p-CH$_3$C(H)(X)—C$_6$H$_4$—O—(CH$_2$)$_2$—O—(CH$_2$)$_3$Si (OCH$_3$)$_3$, and
o,m,p-CH$_3$CH$_2$C(H)(X)—C$_6$H$_4$—O—(CH$_2$)$_2$—O—(CH$_2$)$_3$Si(OCH$_3$)$_3$, wherein X represents chlorine, bromine, or iodine.

Further examples of the above-described organohalide compound having a crosslinkable silyl group include those represented by general formula (5):

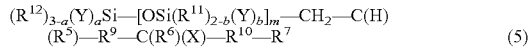　(5)

(wherein R$^5$, R$^7$, R$^8$, R$^9$, R$^{10}$, R$^{11}$, R$^{12}$, a, b, m, X, and Y are the same as described above).

Examples of such a compound include the following:
(CH$_3$O)$_3$SiCH$_2$CH$_2$C(H)(X) C$_6$H$_5$,
(CH$_3$O)$_2$(CH$_3$)SiCH$_2$CH$_2$C(H)(X)C$_6$H$_5$,
(CH$_3$O)$_3$Si(CH$_2$)$_2$C(H)(X)—CO$_2$R,
(CH$_3$O)$_2$(CH$_3$)Si(CH$_2$)$_2$C(H)(X)—CO$_2$R,
(CH$_3$O)$_3$Si(CH$_2$)$_3$C(H)(X)—CO$_2$R,
(CH$_3$O)$_2$(CH$_3$)Si(CH$_2$)$_3$C(H)(X)—CO$_2$R,
(CH$_3$O)$_3$Si(CH$_2$)$_4$C(H)(X)—CO$_2$R,
(CH$_3$O)$_2$(CH$_3$)Si(CH$_2$)$_4$C(H)(X)—CO$_2$R,
(CH$_3$O)$_3$Si(CH$_2$)$_9$C(H)(X)—CO$_2$R,
(CH$_3$O)$_2$(CH$_3$)Si(CH$_2$)$_9$C(H)(X)—CO$_2$R,
(CH$_3$O)$_3$Si(CH$_2$)$_3$C(H)(X)—C$_6$H$_5$,
(CH$_3$O)$_2$(CH$_3$)Si(CH$_2$)$_3$C(H)(X)—C$_6$H$_5$,
(CH$_3$O)$_3$Si(CH$_2$)$_4$C(H)(X)—C$_6$H$_5$, and
(CH$_3$O)$_2$(CH$_3$)Si(CH$_2$)$_4$C(H)(X)—C$_6$H$_5$, (wherein X represents chlorine, bromine, or iodine; and R represents a C$_1$-C$_{20}$ alkyl, aryl, or aralkyl group).

Examples of the organohalide or sulfonyl halide compound having hydroxyl groups include, but are not limited to, those represented by the formula:

HO—(CH$_2$)$_n$—OC(O)C(H)(R)(X)

(wherein X represents chlorine, bromine, or iodine; R represents a hydrogen atom or a C$_1$-C$_{20}$ alkyl, aryl, or aralkyl group; and n represents an integer between 1 and 20).

Examples of the organohalide or sulfonyl halide compound having amino groups include, but are not limited to, those represented by the formula:

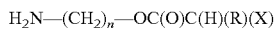

(wherein X is chlorine, bromine, or iodine; R represents a hydrogen atom or a C$_1$-C$_{20}$ alkyl, aryl, or aralkyl group; and n is an integer between 1 and 20).

Examples of the organohalide or sulfonyl halide compound having epoxy groups include, but are not limited to, those represented by the formula:

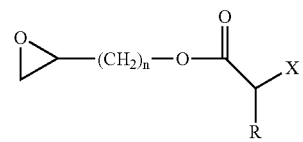

(wherein X represents chlorine, bromine, or iodine; R represents a hydrogen atom or a C$_1$-C$_{20}$ alkyl, aryl, or aralkyl group; and n represents an integer between 1 and 20).

In order to prepare a polymer having two or more halogen groups per molecule, an organohalide compound or sulfonyl halide compound having two or more initiation sites is preferably used as the initiator. Examples of such an initiator include the following:

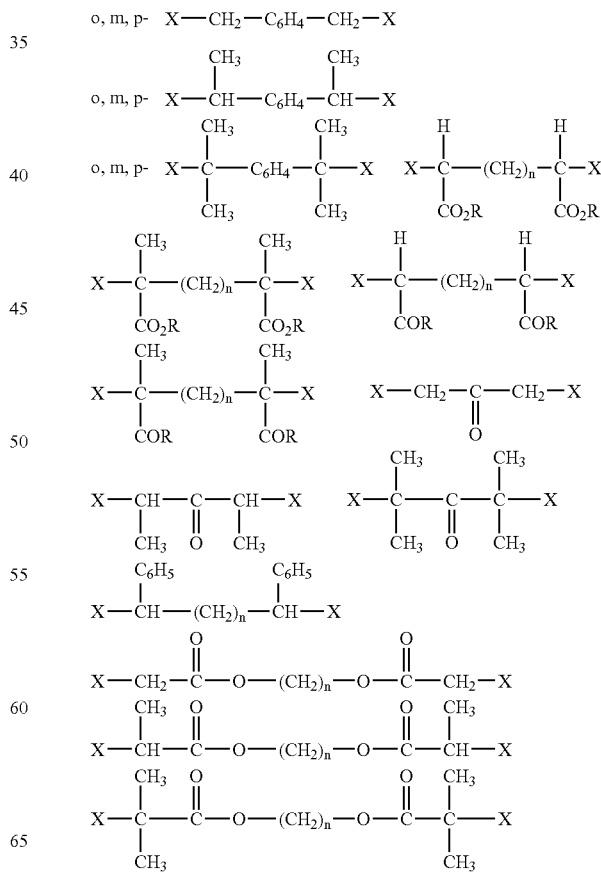

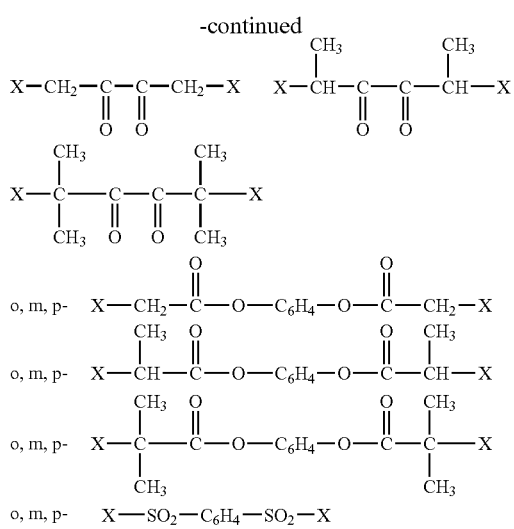

The transition metal complexes usable as the polymerization catalyst are not particularly limited but are preferably those having a Group VII, VIII, IX, X, or XI element as the central metal. Copper(0) complexes, copper(I) complexes, ruthenium(II) complexes, iron(II) complexes, and nickel(II) complexes are particularly preferred. Copper complexes are most preferred. Examples of the copper(I) compound include cuprous chloride, cuprous bromide, cuprous iodide, cuprous cyanide, cuprous oxide, and cuprous perchlorate. When copper compounds are used, 2,2'-bipyridyl or its derivative, 1,10-phenanthroline or its derivative, a polyamine, such as tetramethylethylenediamine, pentamethyldiethylenetriamine, or hexamethyltris(2-aminoethyl)amine, or the like is added as a ligand to increase the catalytic activity. A tristriphenylphosphine ruthenium(II) chloride complex ($RuCl_2(PPh_3)_3$) is also an adequate catalyst. When a ruthenium compound is used as the catalyst, an aluminum alkoxide is added as an activator. An iron(II)-bistriphenylphosphine complex ($FeCl_2(PPh_3)_2$), a nickel(II)-bistriphenylphosphine complex ($NiCl_2(PPh_3)_2$), and a nickel(II)-bistributylphosphine complex ($NiBr_2(PBu_3)_2$) are also adequate catalysts.

The (meth)acrylic monomer used in the ATRP is not particularly limited. Examples thereof include (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, ethylene oxide adducts of (meth)acrylic acid, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl(meth)acrylate, and 2-perfluorohexadecylethyl(meth)acrylate. These may be used alone or in combination to produce a copolymer. Acrylic ester monomers, which provide products having satisfactory properties, are preferred, and butyl acrylate is particularly preferred. In the present invention, these preferable monomers may be used in combination with other monomers to form copolymers or block copolymers. In such a case, the content of the preferable monomer or monomers is preferably 40 percent by weight. In the description above, the term "(meth)acrylic acid" refers to "acrylic acid and/or methacrylic acid".

The ATRP can be performed with or without a solvent. The type of the solvent is not particularly limited. Examples of the solvent include hydrocarbon solvents such as benzene and toluene; ether solvents such as diethyl ether, tetrahydrofuran, diphenyl ether, anisole, and dimethoxybenzene; halogenated hydrocarbon solvents such as methylene chloride, chloroform, and chlorobenzene; ketonic solvents, such as acetone, methyl ethyl ketone, and methyl isobutyl ketone; alcohol solvents such as methanol, ethanol, propanol, isopropanol, n-butyl alcohol, and tert-butyl alcohol; nitrile solvents such as acetonitrile, propionitrile, and benzonitrile; ester solvents such as ethyl acetate and butyl acetate; carbonate solvents such as ethylene carbonate and propylene carbonate; and amide solvents such as N,N-dimethylformamide and N,N-dimethylacetamide. These may be used alone or in combination. The polymerization may be conducted in an emulsion system or in a system using supercritical fluid $CO_2$ as a medium.

The polymerization temperature is not particularly limited but may be in the range of 0 to 200° C., preferably in the range of room temperature to 150° C., and more preferably in the range of 50 to 120° C.

The term "(meth)acrylic polymer produced by ATRP" refers to a (meth)acrylic polymer produced by ATRP or a modified form thereof. Examples of the (meth)acrylic polymer are polymers of (meth)acrylic monomers described above. Acrylic ester (co)polymers are preferable since they provide products with satisfactory properties. Butyl acrylate (co)polymers are particularly preferable.

The molecular weight of the (meth)acrylic polymer is not particularly limited but is preferably in the range of 1,000 to 100,000 and more preferably in the range of 5,000 to 50,000 in terms of number-average molecular weight. The molecular weight distribution of the (meth)acrylic polymer is not particularly limited but is preferably in the range of 1.05 to 1.50, and more preferably in the range of 1.10 to 1.40.

The method for producing the alkenyl-terminated (meth)acrylic polymer is not particularly limited. Examples of the method include:

(1) a method for copolymerizing a particular (meth)acrylic monomer with a (meth)acrylic monomer having an alkenyl group in an ester moiety of a side chain thereof under ATRP conditions;

(2) a method of reacting a compound having two or more alkenyl groups having low radical polymerizabilities with terminal halogen groups of the (meth)acrylic polymer under ATRP conditions; and (3) a method for replacing terminal halogen groups of the (meth)acrylic polymer by a particular compound having alkenyl groups.

The method (2) is particularly preferred since the molecular weight of, the molecular weight distribution of, and the number of functional groups in the (meth)acrylic polymer can be controlled, and thus molecules of the (meth)acrylic polymer can be designed to meet the purpose.

The method (2) for producing the alkenyl-terminated (meth)acrylic polymer will now be described in detail.

When a compound having two or more alkenyl groups having low radical polymerizabilities is added during or at the end of the ATRP, substantially one molecule of the compound is added to each terminus, and an alkenyl-terminated polymer is produced as a result. The phrase "at the end of the polymerization" means "when 80% or more, preferably 90% or more, more preferably 95% or more, and most preferably 99% or more of the monomer have been polymerized".

The compound having two alkenyl groups having low radical polymerizabilities for use in introducing alkenyl groups is selected from those represented by general formula (9):

(9)

(wherein $R^{13}$ represents the same group as above; and $R^{14}$ and $R^{15}$ each represents a hydrogen atom or a methyl group and may be the same or different).

The compounds represented by general formula (9) are not particularly limited. When $R^{13}$ is a divalent $C_1$-$C_{20}$ hydrocarbon group, the compounds represented by the following formula are preferred:

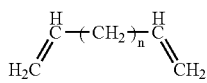

In the formula, n represents an integer between 1 and 20. Preferably, n is 2, 4, or 6 in view of the availability of the starting materials. In particular, 1,5-hexadiene, 1,7-octadiene, and 1,9-decadiene are preferred.

The compound having two or more alkenyl groups having low radical polymerizabilities is preferably added in an excess amount to the propagating termini. When the compound is added in an amount equal to or smaller than the propagating termini, both alkenyl groups would react with the polymer molecules to thereby couple the polymerization termini. When the two alkenyl groups of the compound have the same reactivity, coupling occurs at a particular statistical probability based on the excess amount of the compound. The amount of the compound is preferably at least 1.5 times larger, more preferably 3 times larger, and most preferably 5 times larger than that of the termini.

A post-treatment of the alkenyl-terminated (meth)acrylic polymer (A) produced by the ATRP will now be described in detail. The term "post-treatment" refers to processing of the (meth)acrylic polymer or a mixture containing the polymer, carried out after the ATRP. The post-treatment may be performed on a physically or chemically modified (meth)acrylic polymer or a mixture containing such a polymer. Examples of the post-treatment include removal of the solvent used in the polymerization and the like; removal of insoluble components, such as a polymerization catalyst; purification by extraction with water or by using adsorbents; and heat treatment. Chemical modification, such as removal of halogen groups and the like or introduction of functional groups, is also one type of the post-treatment. In the present invention, the post-treatment is not particularly limited and various processes may be used. An example is a process including Step 1 and Step 2 described in detail below:

Step 1 (heating step): heating the (meth)acrylic polymer produced by the ATRP to a temperature in the range of 140° C. to 250° C.; and Step 2 (solid-liquid separation step): separating insoluble components in the (meth)acrylic polymer obtained by Step 1.

By performing Steps 1 and 2, impurities (i.e., catalyst poisons for hydrosilylation) in the polymer can be reduced; accordingly, the amount of the hydrosilylation catalyst can be reduced. According to the process including Steps 1 and 2, the amount of the adsorbent used in the purification step can be reduced, and the purification process can thus be simplified.

In the present invention, Step 1 is preferably performed before Step 2. Another step may be performed between Step 1 and Step 2, but preferably, Step 2 is performed directly after Step 1.

In Step 1, the (meth)acrylic polymer is heated. The heating temperature is preferably high, but an excessively high temperature results in deterioration of the (meth)acrylic polymer. The temperature is preferably in the range of 140° C. to 250° C., more preferably in the range of 170° C. to 250° C., and most preferably in the range of 190° C. to 250° C. The heating time is not particularly limited but is normally in the range of several minutes to several ten hours. The heating time should not be excessively long since excessively long heating results in thermal deterioration of the (meth)acrylic polymer. In some cases, the heating temperature may be increased to reduce the time taken for the process. The particle size of the solid components in the polymer tends to increase by performing Step 1.

Step 1 may be performed with or without solvent. Preferably, Step 1 is performed without solvent, if possible. The pressure applied to the polymer during the heating is not particularly limited but the heating is preferably performed under a reduced pressure. The pressure applied during the heating is normally 700 Torr or less, preferably 100 Torr or less, more preferably 20 Torr or less, and most preferably 10 Torr or less. When heating is performed under a reduced pressure, the extent of surface renewal largely affects the efficiency of removing impurities. When the heating is performed under a reduced pressure, stirring or the like is preferably performed to maintain the desired surface state by constant renewal.

When (meth)acrylic polymer contains halogen groups, dehalogenation reaction may be performed in Step 1. The above-described process conditions are also suitable for dehalogenation. However, since halides having a relatively low boiling point are produced by the dehalogenation, the heating is preferably performed while removing the halides under a reduced pressure. In particular, since the (meth)acrylic polymer produced by the above-described method (2) for producing the alkenyl-terminated (meth)acrylic polymer contains a halogen group in the molecule, this (meth)acrylic polymer is preferably subjected to dehalogenation while being heated under a reduced pressure.

In Step 2, insoluble components in the (meth)acrylic polymer are removed (solid-liquid separation step). The method of solid-liquid separation is not particularly limited. A common method, such as filtration or sedimentation, may be employed.

Examples of the filtering method include vacuum filtration using, for example, Nutsche filters, and pressure filtration such as filter-pressing. When the amounts of insoluble components are small and the filterability is high, for example, sand filtration or simple filtration using a cartridge filter, a bag filter, or the like, is useful. Examples of the sedimentation method include settling methods and centrifuge sedimentation methods using, for example, decanters or disk-type centrifuges. Examples of methods combining filtration and sedimentation include horizontal disk filtration methods and centrifugal filtration methods using basket-type centrifugal filters or the like.

In Step 2, a filter aid may be used according to the particle diameters or the amounts of insoluble components. The filter aid is not particularly limited and may be of a common type, such as diatomite. When the viscosity of the (meth)acrylic polymer is high and thus the solid-liquid separation is difficult, the (meth)acrylic polymer may be diluted with a solvent. The diluent solvent is not particularly limited and may be of any conventional type. However, since a solvent having a polarity higher than that of the (meth)acrylic polymer increases the solubility of the polymerization catalyst and the like, a solvent having a polarity lower than that of the (meth)acrylic polymer is preferably used. When the polarity is excessively low, dissolution of the (meth)acrylic polymer becomes difficult. Thus, an appropriate solvent is preferably selected according to the polarity of the (meth)acrylic polymer. Two or more solvents may be used in combination to adjust the polarity of the solvent. When the (meth)acrylic polymer is a (meth)acrylic ester polymer, a hydrocarbon compound, such as toluene, xylene, hexane, or methylcyclohexane, is preferably used. The solid-liquid separation may be performed while heating the (meth)acrylic polymer or a mixture thereof.

The adsorption process will now be described in detail. In the present invention, impurities in the (meth)acrylic polymer may be removed by performing an adsorption process during Step 1 described above or in a different step from Step 1. In the present invention, if required, a process using an adsorbent may be performed to obtain a (meth)acrylic polymer having a higher purity, i.e., a (meth)acrylic polymer containing smaller amounts of impurities.

A transition metal and a ligand, which is used to increase the polymerization activity, used during the polymerization cause coloring of the polymer. They are also catalyst poisons in hydrosilylation. The ligand, which is a basic compound, is preferably removed by an acidic adsorbent. In general, basic adsorbents have high ability to adsorb transition metals. Accordingly, by using an acidic adsorbent and/or a basic adsorbent, an alkenyl-terminated (meth)acrylic polymer can be purified at a higher efficiency. As a result, the amount of the hydrosilylation catalyst used during the hydrosilylation of the polymer can be reduced.

The adsorbent used in the present invention is, for example, an acidic adsorbent or a basic adsorbent. Here, the term "acidic adsorbent" refers to "an adsorbent having an ability to adsorb a basic compound" or "an adsorbent capable of cation exchange". The term "basic adsorbent" refers to "an adsorbent having an ability to adsorb an acidic compound" or "an adsorbent capable of anion exchange".

As the adsorbent, activated charcoal, a synthetic resin adsorbent, such as an ion-exchange resin, or an inorganic adsorbent, such as zeolite, may be used.

Activated charcoal is mainly composed of a carbonaceous substance and exhibits high adsorbency. Activated charcoal is produced by, for example, dry distillation of wood, lignite, peat, or the like in the presence of zinc chloride or phosphoric acid as an activator or by activating charcoal with steam. Activated charcoal is usually powdery or granular. Either type of activated charcoal can be used. Because of the production processes, chemically activated charcoal is acidic and charcoal activated with vapor is basic.

An ion-exchange resin may be used as the synthetic resin adsorbent. The ion-exchange resin may be of any conventional type, such as acidic or basic ion-exchange resin. A chelating ion-exchange resin may also be used. Examples of the functional group of the acidic ion-exchange resin include a carboxylic acid group and a sulfonic acid group. An example of the functional group of the basic ion-exchange resin is an amino group. Examples of the functional groups of the chelating ion-exchange resin include an iminodiacetic acid group and a polyamine group.

In general, inorganic adsorbents contain a solid acid or a solid base and consist of porous particles. Their adsorbency is thus very high. One of the features of the inorganic adsorbents is that they can be used at a wide range of temperature, from low temperature to high temperature. The inorganic adsorbent is not particularly limited. Representative examples thereof are those mainly composed of aluminum, magnesium, silicon, or any combination of these. Examples of the inorganic adsorbent include silicon dioxide; magnesium oxide; silica gel; silica-alumina (aluminum silicate); magnesium silicate; activated alumina; aluminum hydroxide; clay adsorbents such as acid earth and activated earth; zeolite adsorbents composed of hydrous aluminosilicate minerals such as aluminum sodium silicate; dawsonites; and hydrotalcites.

Both natural zeolites and synthetic zeolites are usable.

Various types of silicon dioxide, e.g., crystalline, amorphous, non-crystalline, glassy, synthetic, and natural, silicon dioxides, are known in the art. In the present invention, any type of silicon dioxide in the form of powder can be used. Nonlimiting examples of the silicon dioxide include silicates obtained from clay minerals prepared by acid-treating activated earth; and synthetic silicates such as Carplex BS304, Carplex BS304F, Carplex #67, and Carplex #80 (all produced by Shionogi & Co., Ltd.).

Aluminum silicates are a type of silicate in which silicon atoms are partially replaced by aluminum atoms. Examples thereof include pumice, fly ash, kaolin, bentonite, activated earth, and diatomite. Synthetic aluminum silicates have a large specific surface and exhibit high adsorbency. Examples of the synthetic silicate are those of Kyowaad 700 series (produced by Kyowa Chemical Industry Co., Ltd.) but the synthetic silicate is not limited to these.

Hydrotalcites are hydrous hydroxides of divalent metals (such as $Mg^{2+}$, $Mn^{2+}$, $Fe^{2+}$, $Co^{2+}$, $Ni^{2+}$, $Cu^{2+}$, and $Zn^{2+}$) and trivalent metals (such as $Al^{3+}$, $Fe^{3+}$, $Cr^{3+}$, $Co^{3+}$, and $In^{3+}$) or substances in which hydroxyl groups of these hydrous hydroxides are partly replaced by anions such as halogen ions, $NO_3^-$, $CO_3^{2-}$, $SO_4^{2-}$, $Fe(CN)_6^{3-}$, $CH_3CO_2^-$, oxalate ions, or salicylate ions. Among these, a hydrotalcite containing $Mg^{2+}$ as the divalent metal, $Al^{3+}$ as the trivalent metal, and hydroxyl groups partially replaced by $CO_3^{2-}$ is preferable. Nonlimiting examples thereof include synthetic hydrotalcites such as Kyowaad 500 series and Kyowaad 1000 series (produced by Kyowa Chemical Industry Co., Ltd.). Adsorbents produced by baking the above-described hydrotalcites are also suitable. Among these, a $MgO$—$AlO_3$ solid solution prepared by baking a hydrotalcite containing $Mg^{2+}$ as the divalent metal and $Al^{3+}$ as the trivalent metal is preferred. A nonlimiting example thereof is Kyowaad 2000 (produced by Kyowa Chemical Industry Co., Ltd.). Here, baked hydrotalcites are also classified as the hydrotalcites.

Instead of using the acidic adsorbent and/or the basic adsorbent, an adsorbent containing both a solid acid and a solid base may be used. An example of such an adsorbent is magnesium silicate. Magnesium silicate contains both a solid acid and a solid base and can adsorb both an acid and a base.

Nonlimiting examples of aluminum silicate include Kyowaad 600s ($2MgO \cdot 6SiO_2 \cdot XH_2O$, produced by Kyowa Chemical Industry Co., Ltd.) and Mizukalife P-1G (produced by Mizusawa Industrial Chemicals, Ltd.). Kyowaad 600s can adsorb both an acid and a base and is classified as either an acidic adsorbent or a basic adsorbent. Mizukalife P-1G is classified as an acidic adsorbent since it has a high base adsorbency.

Aluminum hydroxide is amphoteric. Although aluminum hydroxide adsorbs a base under certain conditions, it generally adsorbs an acid and is thus classified as a basic adsorbent.

$Al(OH)_3 \cdot NaHCO_3$ is also known as dawsonite and is classified as a basic adsorbent.

Examples of acidic inorganic adsorbents include acid earth, activated earth, aluminum silicate, and silica gel. Examples of basic inorganic adsorbents include magnesium oxide, activated alumina, zeolite adsorbents composed of hydrous aluminosilicate minerals such as aluminum sodium silicate and hydrotalcites.

Among the adsorbents described above, inorganic adsorbents are preferably used in the adsorption treatment of the acrylic polymer. As the acidic adsorbent, acidic earth, activated earth, and aluminum silicate are more preferred; activated earth and aluminum silicate are yet more preferred; and aluminum silicate is most preferred. As the basic adsorbent, activated alumina, zeolite adsorbents composed of hydrous aluminosilicate minerals such as aluminum sodium silicate, and hydrotalcites are preferred; activated alumina and hydrotalcites are more preferred; and hydrotalcites are most preferred.

These adsorbents may be used alone or in combination.

The acrylic polymer produced by ATRP can be purified by bringing it into contact with the acidic adsorbent and/or the basic adsorbent. The acrylic polymer may be brought into contact with a mixture of the acidic adsorbent and the basic adsorbent. Alternatively, the acrylic polymer may be separately brought into contact with the acidic adsorbent and the basic adsorbent.

The adsorption process may be performed at any stage of the post-treatment of the (meth)acrylic polymer. For example, (1) the adsorption may be performed before Step 1;
(2) the heating in Step 1 may be performed in the presence of the adsorbent;
(3) the adsorption may be performed after the heating in Step 1, and the adsorbent may be recovered during the solid-liquid separation in Step 2; or
(4) the adsorption may be performed after the solid-liquid separation in Step 2.

The acrylic polymer prepared by ATRP may be put into contact with the adsorbent in the presence or absence of a solvent. Alternatively, the reaction mixture may be concentrated by removing the solvent by distillation. Since solvents must usually be recycled, the process is most preferably conducted without any solvent. If a solvent must be used, the amount of the solvent is preferably small, i.e., the concentration of the acrylic polymer is preferably high. However, if the viscosity of the acrylic polymer is high and thus handling is difficult, the acrylic polymer may be diluted with a small amount of solvent, and the resulting solution of the acrylic polymer may be put into contact with the adsorbent. In this case, the acrylic polymer content is preferably at least 60 percent by weight, more preferably at least 70 percent by weight, yet more preferably at least 80 percent by weight, and most preferably 90 percent by weight. A common diluent may be used.

The adsorption temperature is not particularly limited but is usually in the range of 0° C. to 200° C. and preferably in the range of room temperature to 180° C. When no solvent is used, a high temperature is preferable. In such a case, the adsorption is preferably conducted at a temperature in the range of 0° C. to 250° C., preferably room temperature to 200° C., and most preferably 100° C. to 180° C.

Use of large amounts of adsorbents is not economical and complicates the handling. Thus, the adsorbent content is usually 0.01 to 10 parts by weight, preferably 0.1 to 10 parts by weight, more preferably 0.5 to 10 parts by weight, yet more preferably 0.5 to 5 parts by weight, and most preferably 0.5 to 2 parts by weight to 100 parts by weight of the acrylic polymer.

The contact between the adsorbent and the polymer or the polymer solution (solid-liquid contact) can be made in various manners. Examples thereof include a batch process in which the mixing with stirring and the solid-liquid separation are performed by a batch operation; a fixed bed process in which the polymer solution is passed through a container filled with the adsorbent; a moving bed process in which the liquid is passed through a moving bed of the adsorbent; and a fluidized bed process in which the adsorbent is fluidized with a liquid to perform adsorption. If necessary, a process that can improve the dispersion efficiency, such as dispersion by stirring the mixture, shaking of the container, or use of supersonic waves, may be performed.

After the polymer or the polymer solution is put into contact with the adsorbent, the adsorbent is removed by filtration, centrifugation, sedimentation, or the like. The residue is diluted, if necessary, and washed with water to obtain a clear polymer solution.

The adsorption process may be conducted on the alkenyl-containing (meth)acrylic polymer or on the precursor of the alkenyl-containing (meth)acrylic polymer. For example, the adsorption process may be conducted on (i) the alkenyl-containing (meth)acrylic polymer prepared by ATRP or (ii) the (meth)acrylic polymer, which is an intermediate product for producing the alkenyl-containing (meth)acrylic polymer and which contains a carbon-halogen bond having a high reactivity.

In the present invention, the amount of the transition metal remaining in the alkenyl-terminated (meth)acrylic polymer is 10 mg or less per kilogram of the polymer. The amount of the halogen is 500 mg or less per kilogram of the polymer. The amount of the transition metal remaining in the polymer after the post-treatment including Step 1 (heating step) and Step 2 (solid-liquid separation step) and/or the adsorption process is normally reduced to 10 mg or less per kilogram of the polymer. Moreover, the amount of halogen is reduced to 500 mg or less per kilogram of the polymer. By changing the adsorption conditions and the like, the amount of the transition metal derived from the polymerization catalyst and remaining in the polymer can be reduced to 3 mg or less per kilogram of the polymer and the amount of the halogen can be reduced to 300 mg or less per kilogram of the polymer.

In the present invention, the term "hydrosilane compound (B) having a crosslinkable silyl group" refers to "a compound having both a Si—H group (hydrosilyl group) and a crosslinkable silyl group capable of forming a crosslink by silanol condensation or the like".

The hydrosilane compound (B) having a crosslinkable silyl group of the present invention is not particularly limited. Typical examples thereof include those represented by general formula (14):

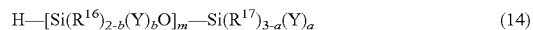

$$H-[Si(R^{16})_{2-b}(Y)_b O]_m-Si(R^{17})_{3-a}(Y)_a \qquad (14)$$

(wherein $R^{16}$ and $R^{17}$ each represent a $C_1$-$C_{20}$ alkyl group, a $C_6$-$C_{20}$ aryl group, a $C_7$-$C_{20}$ aralkyl group, or a triorganosiloxy group represented by $(R')_3Si$— (wherein R's each represent a monovalent $C_1$-$C_{20}$ hydrocarbon group and three R's may be the same of different); when two or more $R^{16}$s or $R^{17}$s are present, they may be the same or different; Y represents a hydroxyl group or a hydrolyzable group; when two or more Ys are present, they may be the same or different; a represents 0, 1, 2, or 3; b represents 0, 1, or 2; m represents an integer between 1 and 19; and a+mb≧1).

The hydrolyzable group represented by Y is not particularly limited and may be any one known in the art. Examples of the hydrolyzable group include hydrogen, a halogen atom, an alkoxy group, an acyloxy group, a ketoximate group, an amino group, an amido group, an acid amide group, an aminooxy group, a mercapto group, and an alkenyloxy group. An alkoxy group, which is mildly hydrolyzable and is easy to handle, is particularly preferred. The number of hydroxyl groups or hydrolyzable groups that can bond to one silicon atom is 1 to 3. Thus, the total number of the hydrolyzable group, i.e., a+mb, is preferably in the range of 1 to 5. When two or more hydrolyzable or hydroxy groups are bonded in the reactive silicon group, the hydrolyzable or hydroxy groups may be the same or different. The number of the silicon atom in the crosslinkable silicon compound may be one or more, and may be about up to 20 when the silicon atoms are bonded through siloxane bonds.

Examples of $R^{16}$ and $R^{17}$ in general formula (14) include alkyl groups such as a methyl group and an ethyl group; cycloalkyl groups such as a cyclohexyl group; aryl groups such as a phenyl group; aralkyl groups such as a benzyl group; and triorganosilyl groups represented by $(R')_3SiO$— wherein R's are each a methyl group, a phenyl group, or the like.

Among these hydrosilane compounds (B), those represented by general formula (15) are particularly preferable in view of the availability:

$$H\!-\!Si(R^{17})_{3-a}(Y)_a \qquad (15)$$

(wherein $R^{17}$, Y, and a are the same as above). Examples of the hydrosilane compound (B) having a crosslinkable group represented by general formula (14) or (15) include the following:

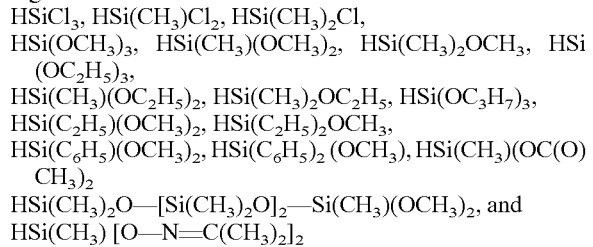

$HSiCl_3$, $HSi(CH_3)Cl_2$, $HSi(CH_3)_2Cl$,
$HSi(OCH_3)_3$, $HSi(CH_3)(OCH_3)_2$, $HSi(CH_3)_2OCH_3$, $HSi(OC_2H_5)_3$,
$HSi(CH_3)(OC_2H_5)_2$, $HSi(CH_3)_2OC_2H_5$, $HSi(OC_3H_7)_3$,
$HSi(C_2H_5)(OCH_3)_2$, $HSi(C_2H_5)_2OCH_3$,
$HSi(C_6H_5)(OCH_3)_2$, $HSi(C_6H_5)_2(OCH_3)$, $HSi(CH_3)(OC(O)CH_3)_2$
$HSi(CH_3)_2O\!-\![Si(CH_3)_2O]_2\!-\!Si(CH_3)(OCH_3)_2$, and
$HSi(CH_3)[O\!-\!N\!=\!C(CH_3)_2]_2$ (wherein $C_6H_5$, represent a phenyl group).

The platinum catalyst (C) of the present invention is a platinum-containing substance used during the step of adding the hydrosilane compound (B) having a crosslinkable silyl group to the termini of the alkenyl-terminated (meth)acrylic polymer. Examples of the platinum catalyst (C) include elemental platinum, a substrate composed of, for example, alumina, silica, or carbon black, and containing dispersed solid platinum, chloroplatinic acid, complexes of chloroplatinic acid and alcohols, aldehydes, ketones, or the like, platinum-olefin complexes, and a platinum(0)-1,1,3,3-tetramethyl-1,3-divinylsiloxane complex. The platinum(0)-1,1,3,3-tetramethyl-1,3-divinylsiloxane complex is particularly preferable due to its high activity. These catalysts may be used alone or in combination. In the present invention, the platinum hydrosilylation catalyst (C) is normally used in an amount of 0.1 to 30 mg (on a platinum metal basis) per kilogram of the alkenyl-terminated (meth)acrylic polymer (A). The amount is more preferably 0.5 to 10 mg since the reaction proceeds at a higher rate, thereby increasing the economical efficiency.

For example, in the step of adding the hydrosilane compound (B) having a crosslinkable silyl group to the alkenyl-terminated (meth)acrylic polymer (A), a predetermined amount of the platinum hydrosilylation catalyst (C) may be mixed with the alkenyl-terminated (meth)acrylic polymer (A) in advance, and the hydrosilane compound (B) having a crosslinkable silyl group may be supplied dropwise or in portions to the resulting mixture. Alternatively, a mixture of the above-described components may be fed at the same time to carry out the reaction.

The addition of the hydrosilane compound (B) having a crosslinkable silyl group to the alkenyl-terminated (meth)acrylic polymer (A) need not be performed in an inert gas atmosphere. However, the addition in a nitrogen atmosphere is preferable to reduce the loss of the hydrosilane compound (B) having a crosslinkable silyl group.

During the addition of the hydrosilane compound (B) having a crosslinkable silyl group to the alkenyl-terminated (meth)acrylic polymer (A), the reaction temperature is not particularly limited but is preferably in the range of 50 to 150° C., and more preferably in the range of 70 to 120° C.

During the addition of the hydrosilane compound (B) having a crosslinkable silyl group to the alkenyl-terminated (meth)acrylic polymer (A), a hydrolyzable ester compound and/or an alkyl alcohol may be added to prevent gelation.

Examples of the hydrolyzable ester compound include trialkyl orthoformates such as trimethyl orthoformate, triethyl orthoformate, tripropyl orthoformate, and tributyl orthoformate; and trialkyl orthoacetates such as trimethyl orthoacetate, triethyl orthoacetate, tripropyl orthoacetate, and tributyl orthoacetate.

Other examples of the hydrolyzable ester compounds are hydrolyzable organic silicon compounds represented by $R_{4-n}SiY_n$, (wherein Y is a hydrolyzable group; R is a monovalent organic group that may contain a functional group; and n is an integer between 1 and 4, and preferably 3 or 4). Examples thereof include methyltriethoxysilane, ethyltriethoxysilane, phenyltriethoxysilane, methyltriacetoxysilane, vinyltrimethoxysilane, γ-methacryloxypropyltrimethoxysilane, γ-mercaptopropyltrimethoxysilane, tetramethyl orthosilicate, tetraethyl orthosilicate, propyl orthosilicate, and tetrabutyl orthosilicate.

The amount of the hydrolyzable ester compound used is 0.1 to 50 parts by weight, and preferably 0.1 to 30 parts by weight to 100 parts by weight of the alkenyl-terminated (meth)acrylic polymer.

The alkyl alcohol in the present invention is preferably an alcohol having 1 to 10 carbon atoms, such as methanol, ethanol, propanol, isopropanol, butanol, isobutyl alcohol, sec-butyl alcohol, tert-butyl alcohol, n-amyl alcohol, hexanol, octanol, or cellosolve. The amount of the alkyl alcohol is preferably 0.1 to 100 parts by weight to 100 parts by weight of the alkenyl-terminated (meth)acrylic polymer.

The above-described hydrolyzable ester compounds may be used alone or in combination. The alkyl alcohols may be used alone or in combination. Alternatively, a mixture of the hydrolyzable ester compound and the alkyl alcohol may be used.

The hydrolyzable ester compound and/or the alkyl alcohol will effectively inhibit the gelation when they are supplied not only during the hydrosilylation reaction but also after the completion of the reaction.

The resulting (meth)acrylic polymer having terminal crosslinkable silyl groups can be directly used as a curable composition.

The (meth)acrylic polymer having terminal crosslinkable silyl groups cures to form a three-dimensional structure by crosslinking reaction when the (meth)acrylic polymer is exposed to moisture. As is previously discussed, the hydrolyzable ester compound and the alkyl group inhibit the hydrolysis of crosslinkable silyl groups during and after the hydrosilylation reaction. However, their inhibitory effect is not strong enough to completely prevent hydrolysis in the presence of the condensation catalyst described below or at high temperatures.

The rate of hydrolysis depends on the temperature, humidity, and type of hydrolyzable group. An appropriate hydrolyzable group must be selected according to the required conditions. The (meth)acrylic polymer having terminal hydrolyzable silyl groups should be kept away from moisture as much as possible during the storage.

The curable composition may be cured with or without a condensation catalyst. Examples of the condensation catalyst include titanates such as alkyl titanate, organosilicon titanate, tetrabutyl titanate, and tetrapropyl titanate; organotin compounds such as dibutyltin dilaurate, dibutyltin diacetyl acetonate, dibutyltin maleate, dibutyltin diacetate, dibutyltin dimethoxide, tin octylate, and tin naphthenate; amine compounds, such as lead octylate, butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methylmorpholine, and 1,3-diazabicyclo(5,4,6)undecene-7, and carboxylates thereof; reaction products or mixtures of organotin compounds and amine compounds, such as reaction products or mixtures of lauryl amine and tin octylate; low-molecular-weight polyamide resins obtained from excessive polyamines and polybasic acids; reaction products of excessive polyamines and epoxy compounds; amino-containing silane coupling agents, e.g., known silanol catalysts such as γ-aminopropyltrimethoxysilane and N-(β-aminoethyl)aminopropylmethyldimethoxysilane. These catalysts may be used alone or in combination. The amount of the catalyst used is preferably 0 to 10 percent by weight of the (meth)acrylic polymer having terminal crosslinkable silyl groups. When the hydrolyzable group Y is an alkoxy group, it is preferable to use a curing catalyst since the curing rate is low with this polymer alone or in combination.

The curing conditions are not particularly limited but curing is generally conducted at a temperature of 0 to 100° C., and preferably 10 to 50° C., for about one hour to about one week. The characteristics of the cured product depend on the main chain skeleton and the molecular weight of the polymer. Various forms of products, i.e., from rubbery to resinous products, can be obtained.

<Curable Composition>

The above-described curable composition may contain various additives for adjusting the physical properties. Examples of the additives include flame retardants, antioxidants, fillers, plasticizers, modifiers, reactive diluents, tackifiers, storage stability improvers, solvents, radical inhibitors, metal deactivators, antiozonants, phosphorus peroxide decomposing agents, lubricants, pigments, foaming agents, and photocurable resins, according to the need. These additives may be used alone.

Since the (meth)acrylic polymer inherently has high durability, antioxidants are not always necessary. If necessary, for example, a conventional antioxidant, UV absorber, or photostabilizer, may be used.

<Fillers>

The filler that can be mixed with the polymer is not particularly limited. In order to provide a higher strength, for example, reinforcing fillers such as pulverized silica, calcium carbonate, talc, titanium oxide, diatomite, barium sulfate, carbon black, surface-treated pulverized calcium carbonate, baked clay, clay, and activated zinc white, may be used. These reinforcing fillers may be used alone or in combination. Among these, pulverized silica is preferred. Hydrous silica prepared by a wet process or the like and dry silica prepared by a dry process or the like may be used. Since an excessively high moisture content in the composition would result in side-reaction during the curing reaction, anhydrous silica is particularly preferred. Anhydrous silica having hydrophobic surfaces is most preferred since the flowability suitable for shaping can be easily achieved. Alternatively, fillers having smaller reinforcing properties may be added to increase the weight or to adjust the properties.

<Plasticizers>

The plasticizer that can be mixed with the polymer is not particularly limited. In order to adjust the physical properties and the like, the following plasticizers may be used alone or in combination: phthalic acid esters such as dibutyl phthalate, diheptyl phthalate, di(2-ethylhexyl)phthalate, and butylbenzyl phthalate; nonaromatic dibasic acid esters such as dioctyl adipate, dioctyl sebacate, dibutyl sebacate, and isodecyl succinate; aliphatic esters such as butyl oleate and methyl acetyl ricinolate; esters of polyalkylene glycol, such as diethylene glycol dibenzoate, triethylene glycol dibenzoate, and pentaerythritol ester; phosphoric esters such as tricresyl phosphate and tributyl phosphate; trimellitic esters; polystyrenes such as polystyrene and poly-α-methylstyrene; polybutadiene, polybutene, polyisobutylene, butadiene-acrylonitrile, and polychloroprene; chlorinated paraffins; hydrocarbon oils such as alkyldiphenyl and partially hydrogenated terphenyl; process oils; polyethers such as polyether polyols, e.g., polyethylene glycol, polypropylene glycol, and polytetramethylene glycol, and derivatives obtained by converting the hydroxyl groups of these polyether polyols into ester or ether groups; epoxy plasticizers such as epoxidized soybean oil and benzyl epoxy stearate; polyester plasticizers obtained from dibasic acids, such as sebacic acid, adipic acid, azelaic acid, and phthalic acid, and dihydric alcohols, such as ethylene glycol, diethylene glycol, triethylene glycol, propylene glycol, and dipropylene glycol; and (meth)acrylic polymers, such as acrylic plasticizers, prepared by polymerizing vinyl monomers by various methods. These plasticizers are not essential components but may be added during the process of preparing the polymer.

<Storage Stability Improvers>

Storage stability improvers capable of preventing significant changes in viscosity during the storage and in curing rate after the storage may be blended with the polymer without any limitation. Examples of the storage stability improver include benzothiazole and dimethyl maleate.

<Solvents>

Examples of the solvent that can be mixed with the polymer include aromatic hydrocarbon solvents such as toluene and xylenes; ester solvents such as ethyl acetate, butyl acetate, amyl acetate, and cellosolve acetate; and ketonic solvents such as methyl ethyl ketone, methyl isobutyl ketone, and diisobutyl ketone. These solvents may be used during the preparation of the polymer.

<Tackifiers>

Any tackifier that can provide an adhesive property to the cured product can be used without limitation. Compounds containing crosslinkable silyl groups are preferred, and silane coupling agents are particularly preferred. Examples thereof include alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane and methyltriisopropenoxysilane; silanes containing vinyl unsaturated groups, such as vinyltrimethoxysilane, vinyldimethylmethoxysilane, vinyltriethoxysilane, γ-methacryloyloxypropylmethyldimethoxysilane, and γ-acroyloxypropylmethyltriethoxysilane; silicone varnishes; and polysiloxanes.

Among these, silane coupling agents having a crosslinkable silyl group and an organic group containing a nonhydrogen, noncarbon atom in the molecule are particularly preferred. Examples of such an organic group include epoxy, (meth)acryl, isocyanate, isocyanurate, carbamate, amino, mercapto, and carboxyl groups. Examples of such silane coupling agents include alkoxysilanes having isocyanate groups, such as γ-isocyanatopropyltrimethoxysilane, γ-isocyanatopropyltriethoxysilane, γ-isocyanatopropylmethyldiethoxysilane, and γ-isocyanatopropylmethyldimethoxysilane; alkoxysilanes having isocyanurate groups, such as tris(trimethoxysilyl)isocyanurate; alkoxysilanes having amino groups, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; alkoxysilanes having mercapto groups, such as γ-mercaptopropyltrimethoxysilane, γ-mercaptopropyltriethoxysilane, γ-mercaptopropylmethyldimethoxysilane, and γ-mercaptopropylmethyldiethoxysilane; alkoxysilanes having carboxyl groups, such as β-carboxyethyltriethoxysilane, β-carboxyethylphenylbis(2-methoxyethoxy)silane, and N-β-(carboxymethyl)aminoethyl-γ-aminopropyltrimethoxysilane; and alkoxysilanes having halogen groups, such as γ-chloropropyltrimethoxysilane.

Derivatives of these silanes, such as amino-modified silyl polymers, silylated amino polymers, unsaturated aminosilane complexes, long-chain phenylaminoalkylsilanes, aminosilylated silicones, and silylated polyesters, may be used as the silane coupling agent.

Among these, alkoxysilanes containing epoxy or (meth) acryl groups in the molecule are particularly preferred in view of curability and adhesion properties. Examples thereof include epoxy-containing alkoxysilanes such as γ-glycidoxypropylmethyldimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, and γ-glycidoxypropylmethyldiisopropenoxysilane; and (meth) acryl-containing alkoxysilanes such as γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, methacryloxymethyltriethoxysilane, acryloxymethyltrimethoxysilane, and acryloxymethyltriethoxysilane. These may be used alone or in combination.

In order to further improve the adhesion properties, a catalyst for condensation of crosslinkable silyl groups (condensation catalyst) may be used together with the tackifier described above. Examples of the condensation catalyst include organotin compounds such as dibutyltin dilaurate, dibutyltin diacetylacetonate, dibutyltin dimethoxide, and tin octylate; organoaluminum compounds such as aluminum acetylacetonate; and organotitanium compounds such as tetraisopropoxy titanium and tetrabutoxy titanium.

Examples of the tackifiers other than the silane coupling agents include, but are not limited to, epoxy resins, phenolic resins, sulfur, alkyl titanates, and aromatic polyisocyanates.

The tackifier is preferably supplied in an amount of 0.01 to 20 parts by weight to 100 parts of the (meth)acrylic polymer. In an amount less than 0.01 parts by weight, the adhesive properties cannot be significantly improved. In an amount exceeding 20 parts by weight, the physical properties of the cured product will be degraded. The amount of the tackifier is preferably 0.1 to 10 parts by weight, and more preferably 0.5 to 5 parts by weight.

These tackifiers may be used alone or in combination. The tackifiers improve the ability of the resulting product to adhere to an adherend.

<Forming Process>

The process for preparing a formed product from the curable composition of the present invention is not particularly limited. Any of the various forming methods commonly employed may be used. Examples of such processes include cast molding, compaction molding, transfer molding, injection molding, extrusion molding, rotational molding, hollow molding, and thermoforming. Injection molding is preferred since it can be automated and continuously performed, thereby achieving high production efficiency. When the curable composition is used to prepare gaskets, the curable composition can be used as a wet type, in which the curable composition applied on flange faces or the like are pressed from both sides and then cured, or a dry type, in which the curable composition applied on flange faces of the like is cured and then pressed.

<Usage>

The usage of the curable composition of the present invention is not limited. For example, the curable composition may be used in the following applications: sealants such as elastic sealing compounds for construction and sealants for double glazing; materials for electric and electronic parts, such as sealants for backings of solar cells; electrical insulating materials such as insulating coating materials for electric wires and cables; pressure-sensitive adhesives; adhesives; elastic adhesives; paints; powder coatings; coating materials; foamed products; potting agents for electric and electronic parts; films; gaskets; cast materials; artificial marble; various molding materials; and sealants for rust- and waterproof sealants for use in edges (cut ends) of wire glass and laminated glass.

A formed product made from the curable composition of the present invention exhibits rubber elasticity and can be used in a variety of areas and in particular, gaskets and packing applications. For example, in the automobile industry, the product may be applied to body parts such as sealants for maintaining hermetic sealing, vibration-control material for glass, vibration-proof materials for carbody, and, in particular, window seal gaskets and door glass gaskets. The product may be applied to chassis components, such as engine and suspension rubbers for controlling noise and vibration, and in particular, engine mount rubbers. The product may be applied to engine components, such as hoses for cooling, fuel supply, and exhaustion control, and sealants for engine oil; to components of exhaust gas purification systems; and to brake components. In the field of household electric appliances, the product may be applied to packing, O-rings, belts, and the like. In particular, the product may be applied to ornaments of lighting equipment, waterproof packing, vibration-proof rubbers, insect-proof packing, vibration-proof, noise-absorbing air sealing for vacuum cleaners, drip-proof coverings for electric water heaters, water-proof packing, packing for heater units, packing for electrode units, safety-valve diaphragms, hoses for Japanese rice wine (Sake) warmers, water-proof packing, electromagnetic valves, water-proof packing for steam ovens and rice cookers, packing for feed water tanks, suction valves, packing for water receivers, connection hoses, belts, packing for heater units of warmers, oil packing for burning appliances such as sealing for steam outlets, O-rings, drain packing, pressure tubes, blast nozzles, packing for gas outlets and inlets, vibration-proof rubbers, packing for oil supply ports, packing for fuel level indicators, oil feed pipes, diaphragm valves, air pipes, and acoustic appliances such as speaker gaskets, speaker edges, turntable sheets, belts, and pulleys. In the field of construction, the product can be applied to structural gaskets (zipper gaskets), roofing materials for pneumatic structures, water-proof materials, preformed sealants, vibration-proof materials, noise-proof materials, setting blocks, and slider materials. In the fields of sports, the product can be applied to sport flooring such as all-weather paving and gymnasium flooring, sports shoes components such as sole materials and inner sole materials, and balls for ball sports such as golf balls. In the field of vibration-proof rubber, the product can be applied to vibration-proof rubbers for automobiles, railroad vehicles, aircrafts, and fenders. In the field of marine and civil engineering, the product may be applied to structural materials, such as rubber expansion joints, bearings, water bars, waterproof sheets, rubber dams, elastic pavement, vibration-proof pads, and protection units; submaterials for construction, such as rubber frames, rubber packers, rubber skirts, sponge matting, mortar hoses, and mortar strainers; and auxiliary materials for construction, such as rubber sheets and air hoses; safeguards products such as rubber buoys and wave absorbers; and environmental conservation products such as oil fences, silt fenses, antifouling materials, marine hoses, dredging hoses, and oil skimmers. The product may be applied to rubber sheets, matting, and foamed sheets.

BEST MODE FOR CARRYING OUT THE INVENTION

The present invention will now be described in conjunction with examples and comparative examples. The present invention is by no means limited to these examples.

In Examples and Comparative Examples below, "parts" and "%" refer to "parts by weight" and "percent by weight", respectively.

In the examples described below, the number-average molecular weight and the molecular weight distribution (the ratio of the weight-average molecular weight to the number-average molecular weight) were determined by gel permeation chromatography (GPC) calibrated with polystyrene standard samples. Shodex GPC K-804 (produced by Showa Denko K. K.) packed with crosslinked polystyrene gel was used as a GPC column, and chloroform was used as a GPC solvent. The number of functional groups, i.e., either the number of alkenyl groups or the number of silyl groups, introduced per polymer molecule was calculated based on the concentration analyzed by $^1$H-NMR and on the number-average molecular weight determined by GPC.

The amount of copper remaining in the polymer was determined by conducting decomposing a mixture containing the polymer after the adsorption treatment, high-purity nitric acid, and high-purity sulfuric acid using microwaves and then determining the amount of copper in the decomposition product using an inductively coupled plasma (ICP) mass analyzer (HP-4500 produced by Yokokawa Electric Co.).

The amount of bromine remaining in the polymer was determined by an oxygen-flask method using an ion chromatograph (DX-500 (with GP 40 and ED 40) produced by Dionex Corporation).

The Examples and Comparative Examples will now be described.

SYNTHETIC EXAMPLE 1

Polymerization of n-butyl acrylate

In a reactor equipped with a stirrer, CuBr (4.2 parts) and acetonitrile (27.3 parts) were charged and stirred for 15 minutes at 65° C. in a nitrogen atmosphere. To the resulting mixture, n-butyl acrylate (100 parts), diethyl 2,5-dibromoadipate (8.8 parts), and acetonitrile (16.6 parts) were supplied, and the resulting mixture was thoroughly stirred. Pentamethyldiethylenetriamine (0.17 part) was fed to initiate polymerization. While the mixture was stirred under heating at 70° C., n-butyl acrylate (400 parts) was continuously added to the mixture dropwise. During the addition of the n-butyl acrylate, triamine (0.68 part) was added in portions.

Introduction of alkenyl Groups to the (meth)acrylic polymer

When the monomer conversion rate reached 96%, the remaining monomer and acetonitrile were removed by evaporation at 80° C. 1,7-Octadiene (53.7 parts), acetonitrile (132 parts), and triamine (1.69 parts) were added to the reaction mixture, and the resulting mixture was stirred under heating at 70° C. A mixture containing an alkenyl-containing polymer was obtained as a result.

Rough Removal of the polymerization Catalyst

The acetonitrile and unreacted 1,7-octadiene in the mixture were evaporated by heating, and the polymer residue was dissolved into methylcyclohexane. The insoluble polymerization catalyst was removed by sedimentation with a centrifugal separator. To the methylcyclohexane solution of the polymer, 6 parts of adsorbents (3 parts of Kyowaad 500SH and 3 parts of Kyowaad 700SL, both produced by Kyowa Chemical Industry Co., Ltd.) to 100 parts of the polymer were added, and the mixture was stirred under heating in a mixed-gas atmosphere of oxygen and nitrogen. Insoluble components were removed, and the resulting polymer solution was concentrated. A polymer (Polymer [1]) having alkenyl groups was obtained as a result.

Polymer [1] had a number-average molecular weight of 25,800 and a molecular-weight distribution of 1.26. The number of alkenyl groups introduced per polymer molecule was 1.8.

Step 1: Heating Step

Polymer [1] was heated at 160° C. for 12 hours with stirring to remove volatile components (pressure: 10 Torr or less).

Step 2: Solid-Liquid Separation Step

The polymer (100 parts) obtained in Step 1 was diluted with 400 parts of methylcyclohexane. Solid components were removed, and the solution was concentrated to obtain a polymer. This polymer had a number-average molecular weight of 26,800 and a molecular weight distribution of 1.34. The number of alkenyl groups introduced per polymer molecule was 1.8. The copper content in the polymer was 7 mg per kilogram of the polymer. The bromine content in the polymer was 280 mg per kilogram of the polymer according to elemental analysis.

EXAMPLE 1

Addition of the hydrosilane Compound (B) Having a Crosslinkable silyl Group to the alkenyl-Containing (meth)acrylic polymer (A)

Methyl orthoformate (3 molar equivalents per alkenyl group), a platinum catalyst (30 mg in terms of platinum metal per kilogram of the polymer), i.e., a xylene solution of a bis(1,3-divinyl-1,1,3,3-tetramethyldisiloxane)platinum complex, hereinafter simply referred to as "platinum catalyst", and methyldimethoxysilane (3 molar equivalents per alkenyl group) were sequentially supplied in that order to the polymer obtained by Steps 1 and 2 described above. The resulting mixture was stirred under heating at 80° C. for 2 hours in a nitrogen atmosphere. Disappearance of the alkenyl groups by the reaction was confirmed by $^1$H-NMR. The reaction mixture was then concentrated to obtain a target polymer containing methoxysilyl groups. This polymer had a number-average molecular weight of 28,900 and a molecular weight distribution of 1.47. The number of silyl groups introduced per polymer molecule was 1.8.

Comparative Example 1

A polymer was prepared by the same Steps 1 and 2 as in SYNTHETIC EXAMPLE 1 except that, in Step 1, the heating was conducted at 160° C. for 3 hours (pressure: 10 Torr or less). The polymer had a number-average molecular weight of 26,100 and a molecular weight distribution of 1.31. The number of alkenyl groups introduced per polymer molecule was 1.8. The copper content in the polymer was 7 mg per kilogram of the polymer. The bromine content in the polymer was 990 mg per kilogram of the polymer according to elemental analysis.

Addition of the hydrosilane Compound (B) Having a Crosslinkable silyl Group to the alkenyl-Containing (meth)acrylic polymer (A)

The polymer obtained as above was subjected to hydrosilylation under the same conditions as in EXAMPLE 1. One hour after the start of the heating, disappearance of methyldimethoxysilane was confirmed by $^1$H-NMR. Methyldimethoxysilane (3 molar equivalents per alkenyl group) was added again and the resulting mixture was stirred for 2 hours under heating at 80° C. Alkenyl groups did not disappear.

SYNTHETIC EXAMPLE 2

Copolymerization of n-butyl acrylate, ethyl acrylate, and 2-methoxyethyl acrylate In a reactor equipped with a stirrer, CuBr (4.6 parts) and acetonitrile (41.6 parts) were charged and stirred for 15 minutes at 65° C. in a nitrogen atmosphere. To the resulting mixture, acrylic esters (a total of 100 parts: n-butyl acrylate (27.6 parts), ethyl acrylate (39.8 parts), and 2-methoxyethyl acrylate (32.6 parts)), and diethyl 2,5-dibromoadipate (13.0 parts) were supplied. The resulting mixture was thoroughly stirred. Pentamethyldiethylenetriamine (hereinafter simply referred to as "triamine", 0.09 part) was fed to the mixture to initiate polymerization. While the mixture was stirred under heating at 70° C., acrylic esters (a total of 400 parts: n-butyl acrylate (111 parts), ethyl acrylate (159 parts), and 2-methoxyethyl acrylate (130 parts)) were continuously added dropwise to the mixture. During the addition of the acrylic esters, triamine (0.84 part) was supplied in portions.

Introduction of alkenyl Groups to the (meth)acrylic polymer

When the monomer conversion rate reached 96%, the remaining monomer and acetonitrile were removed by evaporation at 80° C. 1,7-Octadiene (119 parts), acetonitrile (125 parts), and triamine (1.87 parts) were supplied to the resulting mixture, and the mixture was stirred under heating at 70° C. A mixture containing an alkenyl-containing polymer was obtained as a result.

Rough Removal of the Polymerization Catalyst

The acetonitrile and unreacted 1,7-octadiene in the mixture were evaporated by heating, and the polymer residue was dissolved into methylcyclohexane. The insoluble polymerization catalyst was removed by sedimentation with a centrifugal separator. To the methylcyclohexane solution of the polymer, 4 parts of adsorbents (2 parts of Kyowaad 500SH and 2 parts of Kyowaad 700SL, both produced by Kyowa Chemical Industry Co., Ltd.) to 100 parts of the polymer were added, and the mixture was stirred under heating in a mixed-gas atmosphere of oxygen and nitrogen. Insoluble components were removed, and the resulting polymer solution was concentrated. A polymer (Polymer [2]) having alkenyl groups was obtained as a result.

Polymer [2] had a number-average molecular weight of 18,400 and a molecular-weight distribution of 1.15. The number of alkenyl groups introduced per polymer molecule was 2.0.

Step 1: Heating Step

Polymer [2] was heated at 180° C. for 12 hours with stirring to remove volatile components (pressure: 10 Torr or less).

Step 2: Solid-Liquid Separation Step

The polymer (100 parts) obtained in Step 1 was diluted with 400 parts of toluene. To this toluene solution of the polymer, 6 parts of adsorbents (3 parts of Kyowaad 500SH and 3 parts of Kyowaad 700SL, both produced by Kyowa Chemical Industry Co., Ltd.) to 100 parts of the polymer were fed. The resulting mixture was stirred under heating in a mixed-gas atmosphere of oxygen and nitrogen. Solid components were then removed, and the solution was concentrated to obtain a polymer. This polymer had a number-average molecular weight of 18,800 and a molecular weight distribution of 1.17. The number of alkenyl groups introduced per polymer molecule was 2.0. The copper content in the polymer was 2 mg or less per kilogram of the polymer. The bromine content in the polymer was 260 mg or less per kilogram of the polymer according to elemental analysis.

EXAMPLE 2

Addition of the Hydrosilane Compound (B) Having a Crosslinkable silyl Group to the alkenyl-Containing (meth)acrylic polymer (A)

Methyl orthoformate (1 molar equivalent per alkenyl group), a platinum catalyst (10 mg in terms of platinum metal per kilogram of the polymer), and methyldimethoxysilane (3 molar equivalents per alkenyl group) were sequentially supplied in that order to the polymer obtained by the post-treatment (Steps 1 and 2) of SYNTHETIC EXAMPLE 2. The resulting mixture was stirred under heating at 100° C. for 0.5 hour in a nitrogen atmosphere. Disappearance of the alkenyl groups by the reaction was confirmed by $^1$H-NMR. The reaction mixture was then concentrated to obtain a target polymer containing methoxysilyl groups. This polymer had a number-average molecular weight of 19,400 and a molecular weight distribution of 1.24. The number of silyl groups introduced per polymer molecule was 1.9.

Comparative Example 2

A polymer was prepared by the same Steps 1 and 2 as in SYNTHETIC EXAMPLE 2 except that, in Step 2, no adsorbent was used. The polymer had a number-average molecular weight of 18,600 and a molecular weight distribution of 1.16. The number of alkenyl groups introduced per polymer molecule was 2.0. The copper content in the polymer was 16 mg per kilogram of the polymer. The bromine content in the polymer was 260 mg per kilogram of the polymer according to elemental analysis.

Addition of the hydrosilane Compound (B) Having a Crosslinkable silyl Group to the alkenyl-Containing (meth)acrylic polymer (A)

The polymer obtained as above was subjected to hydrosilylation under the same conditions as in EXAMPLE 2. By $^1$H-NMR, it was confirmed that alkenyl groups did not react even after two hours of the heating.

SYNTHETIC EXAMPLE 3

Polymerization of n-butyl acrylate and introduction of alkenyl groups to the (meth)acrylic polymer were performed as in SYNTHETIC EXAMPLE 1.

Rough Removal of the Polymerization Catalyst

The acetonitrile and unreacted 1,7-octadiene in the mixture were evaporated by heating, and the polymer residue was dissolved into methylcyclohexane. The insoluble polymerization catalyst was removed by sedimentation with a centrifugal separator. To the methylcyclohexane solution of the polymer, 4 parts of adsorbents (2 parts of Kyowaad 500SH and 2 parts of Kyowaad 700SL, both produced by Kyowa Chemical Industry Co., Ltd.) to 100 parts (113 kg) of the polymer were added, and the mixture was stirred under heating in a mixed-gas atmosphere of oxygen and nitrogen. Insoluble components were removed, and the resulting polymer solution was concentrated. A polymer (Polymer [3]) having alkenyl groups was obtained as a result.

Polymer [3] had a number-average molecular weight of 26,400 and a molecular-weight distribution of 1.23. The number of alkenyl groups introduced per polymer molecule was 1.9.

Step 1: Heating Step

Polymer [3] was heated at 180° C. for 12 hours with stirring to remove volatile components (pressure: 10 Torr or less).

Step 2: Solid-Liquid Separation Step

The polymer (100 parts) obtained in Step 1 was diluted with 100 parts of methylcyclohexane. To this methylcyclohexane solution of the polymer, 6 parts of adsorbents (3 parts of Kyowaad 500SH and 3 parts of Kyowaad 700SL, both produced by Kyowa Chemical Industry Co., Ltd.) to 100 parts of the polymer were fed. The resulting mixture was stirred under heating in a mixed-gas atmosphere of oxygen and nitrogen. Solid components were then removed, and the solution was concentrated to obtain a polymer (63 kg). This polymer had a number-average molecular weight of 25,300 and a molecular weight distribution of 1.31. The number of alkenyl groups introduced per polymer molecule was 1.8. The copper content in the polymer was 6 mg or less per kilogram of the polymer. The bromine content in the polymer was 240 mg or less per kilogram of the polymer according to elemental analysis.

EXAMPLE 3

Addition of the hydrosilane Compound (B) Having a Crosslinkable silyl Group to the alkenyl-Containing (meth)acrylic polymer (A): Basic Example of hydrosilylation Methyl orthoformate (1 molar equivalent per alkenyl group), a platinum catalyst (10 mg in terms of platinum metal per kilogram of the polymer), and methyldimethoxysilane (2 molar equivalents per alkenyl group) were sequentially supplied in that order to the polymer obtained by the post-treatment (Steps 1 and 2) of SYNTHETIC EXAMPLE 3. The resulting mixture was stirred under heating at 80° C. for 4 hours in a nitrogen atmosphere. Disappearance of the alkenyl groups by the reaction was confirmed by $^1$H-NMR. The reaction mixture was then concentrated to obtain a target polymer containing methoxysilyl groups. This polymer had a number-average molecular weight of 28,200 and a molecular weight distribution of 1.44. The number of silyl groups introduced per polymer molecule was 1.8.

EXAMPLE 4

Addition of the hydrosilane Compound (B) Having a Crosslinkable silyl Group to the alkenyl-Containing (meth)acrylic polymer (A): at a Reaction Temperature of 100° C.

The polymer obtained in SYNTHETIC EXAMPLE 1 was subjected to hydrosilylation as in EXAMPLE 3 except that the reaction was conducted under heating at 100° C. for 0.5 hour. Disappearance of the alkenyl groups by the reaction was confirmed by $^1$H-NMR. The polymer obtained had a number-average molecular weight of 28,200 and a molecular weight distribution of 1.40. The number of silyl groups introduced per polymer molecule was 1.8.

EXAMPLE 5

Addition of the hydrosilane Compound (B) Having a Crosslinkable silyl Group to the alkenyl-Containing (meth)acrylic polymer (A): Without methyl orthoformate The polymer obtained in SYNTHETIC EXAMPLE 1 was subjected to hydrosilylation as in EXAMPLE 3 except that methyl orthoformate was not added and that the mixture containing methyldimethoxysilane (3 molar equivalents per alkenyl group) was stirred under heating for two hours. Disappearance of alkenyl groups was confirmed by $^1$H-NMR. The polymer obtained had a number-average molecular weight of 27,800 and a molecular weight distribution of 1.41. The number of silyl groups introduced per polymer molecule was 1.8.

EXAMPLE 6

Addition of the hydrosilane Compound (B) Having a Crosslinkable silyl Group to the alkenyl-Containing (meth)acrylic polymer (A): Supplying methyldimethoxysilane in Portions Methyl orthoformate (1 molar equivalent per alkenyl group), a platinum catalyst (5 mg in terms of platinum metal per kilogram of the polymer), and methyldimethoxysilane (1.5 molar equivalents per alkenyl group) were sequentially supplied in that order to the polymer obtained in SYNTHETIC EXAMPLE 3. The resulting mixture was stirred under heating at 80° C. for 5 hours in a nitrogen atmosphere. Methyldimethoxysilane (1.5 molar equivalents per alkenyl group) was supplied to the mixture and the resulting mixture was heated at 80° C. for an hour with stirring. Disappearance of the alkenyl groups by the reaction was confirmed by $^1$H-NMR. The reaction mixture was then concentrated to obtain a target polymer containing methoxysilyl groups. This polymer had a number-average molecular weight of 28,000 and a molecular weight distribution of 1.37. The number of silyl groups introduced per polymer molecule was 1.6.

Comparative Example 3

The polymer obtained in SYNTHETIC EXAMPLE 1 was subjected to hydrosilylation as in EXAMPLE 3 except that the platinum catalyst was not used. The number of alkenyl groups did not decrease according to $^1$H-NMR, and a polymer containing methoxysilyl groups was not obtained.

SYNTHETIC EXAMPLE 4

Copolymerization of n-butyl acrylate, ethyl acrylate, and 2-methoxyethyl acrylate and introduction of alkenyl groups to the (meth)acrylic polymer were performed as in SYNTHETIC EXAMPLE 2.

Rough Removal of the Polymerization Catalyst

The acetonitrile and unreacted 1,7-octadiene in the mixture were evaporated by heating, and the polymer residue was dissolved into toluene. The insoluble polymerization catalyst was removed by sedimentation with a centrifugal separator. To the toluene solution of the polymer, 4 parts of adsorbents (2 parts of Kyowaad 500SH and 2 parts of Kyowaad 700SL, both produced by Kyowa Chemical Industry Co., Ltd.) to 100 parts (125 kg) of the polymer were added, and the mixture was stirred under heating in a mixed-gas atmosphere of oxygen and nitrogen. Insoluble components were removed, and the resulting polymer solution was concentrated. A polymer (Polymer [4]) having alkenyl groups was obtained as a result.

Polymer [4] had a number-average molecular weight of 17,700 and a molecular-weight distribution of 1.11. The number of alkenyl groups introduced per polymer molecule was 2.0.

Step 1: Heating Step

Polymer [4] was heated at 180° C. for 12 hours with stirring to remove volatile components (pressure: 10 Torr or less).

Step 2: Solid-Liquid Separation Step

The polymer (100 parts) obtained in Step 1 was diluted with 100 parts of toluene. To this toluene solution, 6 parts of adsorbents (3 parts of Kyowaad 500SH and 3 parts of Kyowaad 700SL, both produced by Kyowa Chemical Industry Co., Ltd.) to 100 parts of the polymer were fed. The resulting mixture was stirred under heating in a mixed-gas atmosphere of oxygen and nitrogen. Solid components were then removed, and the solution was concentrated to obtain a polymer (113 kg). This polymer had a number-average molecular weight of 17,800 and a molecular weight distribution of 1.15. The number of alkenyl groups introduced per polymer molecule was 2.1. The copper content in the polymer was 3 mg per kilogram of the polymer. The bromine content in the polymer was 280 mg per kilogram of the polymer according to elemental analysis.

EXAMPLE 7

Addition of the hydrosilane Compound (B) Having a Crosslinkable silyl Group to the alkenyl-Containing (meth)acrylic polymer (A): Using platinum Catalyst (10 mg in Terms of platinum Metal Per Kilogram of the polymer)

Methyl orthoformate (1 molar equivalent per alkenyl group), a platinum catalyst (10 mg in terms of platinum metal per kilogram of the polymer), and methyldimethoxysilane (2 molar equivalents per alkenyl group) were supplied in that order to the polymer obtained by the post-treatment (Steps 1 and 2) of SYNTHETIC EXAMPLE 4. The resulting mixture was stirred under heating at 100° C. for 0.5 hour in a nitrogen atmosphere. Disappearance of the alkenyl groups by the reaction was confirmed by $^1$H-NMR. The reaction mixture was then concentrated to obtain a target polymer containing methoxysilyl groups. This polymer had a number-average molecular weight of 18,600 and a molecular weight distribution of 1.17. The number of silyl groups introduced per polymer molecule was 1.8.

EXAMPLE 8

Addition of the hydrosilane Compound (B) Having a Crosslinkable silyl Group to the alkenyl-Containing (meth)acrylic polymer (A): Using platinum Catalyst (5 mg in Terms of platinum Metal Per Kilogram of the polymer)

The polymer obtained in SYNTHETIC EXAMPLE 4 was subjected to hydrosilylation as in EXAMPLE 7 except that the platinum catalyst (5 mg in terms of platinum metal per kilogram of the polymer) was used. Disappearance of the alkenyl groups by the reaction was confirmed by $^1$H-NMR.

The polymer obtained had a number-average molecular weight of 18,600 and a molecular weight distribution of 1.19. The number of silyl groups introduced per polymer molecule was 1.9.

EXAMPLE 9

Addition of the hydrosilane Compound (B) Having a Crosslinkable silyl Group to the alkenyl-Containing (meth)acrylic polymer (A): Using platinum Catalyst (1 mg in Terms of platinum Metal Per Kilogram of the polymer)

The polymer obtained in SYNTHETIC EXAMPLE 4 was subjected to hydrosilylation as in EXAMPLE 7 except that the platinum catalyst (1 mg in terms of platinum metal per kilogram of the polymer) was used. Disappearance of the alkenyl groups by the reaction was confirmed by $^1$H-NMR. The polymer obtained had a number-average molecular weight of 18,800 and a molecular weight distribution of 1.19. The number of silyl groups introduced per polymer molecule was 1.9.

EXAMPLE 10

The polymer obtained in SYNTHETIC EXAMPLE 4 was subjected to hydrosilylation as in EXAMPLE 7 except that the amount of the platinum catalyst was changed to 40 mg in terms of platinum metal per kilogram of the polymer, that the amount of methyldimethoxysilane was changed to 6 molar equivalents per alkenyl group, and the reaction time was changed to 8 hours. Disappearance of the alkenyl groups by the reaction was confirmed by $^1$H-NMR. The polymer obtained had a number-average molecular weight of 19,100 and a molecular weight distribution of 1.22. The number of silyl groups introduced per polymer molecule was 1.8. The color of this polymer containing methoxysilyl groups was brown and deeper than any of the polymers obtained in EXAMPLES 5 to 7.

Comparative Example 4

The polymer obtained in SYNTHETIC EXAMPLE 2 was subjected to hydrosilylation as in EXAMPLE 7 but without the platinum catalyst. The number of alkenyl groups did not decrease according to $^1$H-NMR, and a polymer containing methoxysilyl groups was not obtained.

SYNTHETIC EXAMPLE 5

Polymerization of n-butyl acrylate and introduction of alkenyl groups to the (meth)acrylic polymer were performed as in SYNTHETIC EXAMPLE 1.

The polymer obtained had a number-average molecular weight of 23,600 and a molecular-weight distribution of 1.21. The number of alkenyl groups introduced per polymer molecule was 2.0.

Rough Removal of Polymerization Catalyst

The acetonitrile and unreacted 1,7-octadiene in the mixture were evaporated by heating, and 100 (124 kg) parts of the polymer residue was dissolved into 100 parts (124 kg) of methylcyclohexane. To this solution, 1 part of adsorbents (0.5 part (0.62 kg) of Kyowaad 500SH and 0.5 part (0.62 kg) of Kyowaad 700SL, both produced by Kyowa Chemical Industry Co., Ltd.) and 1 part (1.24 kg) of a filter aid relative to 100 parts (124 kg) of the polymer were supplied. The mixture was stirred under heating at 100° C. in a mixed-gas atmosphere of oxygen and nitrogen. Insoluble components were removed, and the resulting polymer solution was concentrated at 100° C. A polymer (Polymer [5]) was obtained as a result.

Step 1: Heating Step

To Polymer [5] obtained as above, 0.1 part of a carbon radical scavenger, i.e., Sumilizer GS (produced by Sumitomo Chemical Co., Ltd.), to 100 parts of the polymer was supplied. The mixture was heated for 12 hours at a vacuum of 8 Torr or less at 170° C. to 176° C. in the presence of 1 part of adsorbents (0.5 parts of Kyowaad 500SH and 0.5 parts of Kyowaad 700SL, both produced by Kyowa Chemical Industry Co., Ltd.) relative to 100 parts of the polymer so as to conduct dehalogenation. A polymer having a number-average molecular weight of 24,900 and a molecular weight distribution of 1.27 was obtained as a result.

Step 2: Solid-Liquid Separation Step

To 100 parts (110 kg) of the polymer obtained by Step 1 above, 0.01 part (11 g) of a hindered phenol antioxidant, Irganox1010, Ciba Specialty Chemicals) and 2 parts of adsorbents (1 part (1.1 kg) of Kyowaad 500SH and 1 part (1.1 kg) of Kyowaad 700SL, both produced by Kyowa Chemical Industry Co., Ltd.) were added. The resulting mixture was stirred under heating at 150° C. for 4 hours in a mixed-gas atmosphere of oxygen and nitrogen. The mixture was diluted with 100 parts of toluene, and solid components were removed. The solution was concentrated to obtain a polymer (82 kg). This polymer had a number-average molecular weight of 24,000 and a molecular weight distribution of 1.26. The number of alkenyl groups introduced per polymer molecule was 1.9. The copper content in the polymer was 2 mg or less per kilogram of the polymer. The bromine content in the polymer was 170 mg per kilogram of the polymer.

EXAMPLE 11

Addition of the hydrosilane Compound (B) Having a Crosslinkable silyl Group to the alkenyl-Containing (meth)acrylic polymer (A): Using Platinum Catalyst (10 mg in Terms of Platinum Metal Per Kilogram of the Polymer)

Methyl orthoformate (1 molar equivalent per alkenyl group), a platinum catalyst (10 mg in terms of platinum metal per kilogram of the polymer), and methyldimethoxysilane (2 molar equivalents per alkenyl group) were supplied in that order to the polymer obtained by the post-treatment (Steps 1 and 2) of SYNTHETIC EXAMPLE 5. The resulting mixture was stirred under heating at 100° C. for 1 hour in a nitrogen atmosphere. Disappearance of the alkenyl groups by the reaction was confirmed by $^1$H-NMR. The reaction mixture was then concentrated to obtain a target polymer containing methoxysilyl groups. This polymer had a number-average molecular weight of 24,800 and a molecular weight distribution of 1.29. The number of silyl groups introduced per polymer molecule was 1.9.

SYNTHETIC EXAMPLE 6

Copolymerization of n-butyl acrylate, ethyl acrylate, and 2-methoxyethyl acrylate and introduction of alkenyl groups to the (meth)acrylic polymer were performed as in SYNTHETIC EXAMPLE 2. The polymer obtained thereby had a number-average molecular weight of 17,000 and a molecular weight distribution of 1.11. The number of silyl groups introduced per polymer molecule was 1.9.

Rough Removal of Polymerization Catalyst

The acetonitrile and unreacted 1,7-octadiene in the mixture were evaporated by heating. The polymer residue (100 parts, 125 kg) was dissolved into 100 parts (125 kg) of toluene. To the solution, 1 part of adsorbents (0.5 part (0.66 kg) of Kyowaad 500SH and 0.5 part (0.66 kg) of Kyowaad 700SL, both produced by Kyowa Chemical Industry Co., Ltd.) and 1 part (1.32 kg) of a filter aid relative to 100 parts (125 kg) of the polymer were supplied. The mixture was stirred under heating at 100° C. in a mixed-gas atmosphere of oxygen and nitrogen. Insoluble components were removed, and the resulting polymer solution was concentrated at 100° C. A polymer (Polymer [6]) was obtained as a result.

Step 1: Heating Step

To Polymer [6] obtained as above, 0.1 part of a carbon radical scavenger, i.e., Sumilizer GS (produced by Sumitomo Chemical Co., Ltd.), to 100 parts of the polymer was supplied. The mixture was heated for 12 hours at a vacuum of 9 Torr or less at 175 to 177° C. in the presence of 2 parts of adsorbents (1 part of Kyowaad 500SH and 1 part of Kyowaad 700SL, both produced by Kyowa Chemical Industry Co., Ltd.) relative to 100 parts of the polymer to conduct dehalogenation.

Step 2: Solid-Liquid Separation Step

To 100 parts (103 kg) of the polymer obtained by Step 1 above, 0.05 part (53 g) of a hindered phenol antioxidant (Irganox1010, Ciba Specialty Chemicals) and 2 parts of adsorbents (1 part (1.0 kg) of Kyowaad 500SH and 1 part (1.0 kg) of Kyowaad 700SL, both produced by Kyowa Chemical Industry Co., Ltd.) were added. The resulting mixture was stirred under heating at 150° C. for 4 hours in a mixed-gas atmosphere of oxygen and nitrogen. The mixture was diluted with 100 parts of toluene, and solid components were removed. The solution was concentrated to obtain a polymer (98 kg). This polymer had a number-average molecular weight of 16,800 and a molecular weight distribution of 1.13. The number of alkenyl groups introduced per polymer molecule was 1.9. The copper content in the polymer was 2 mg or less per kilogram of the polymer. The bromine content in the polymer was 290 mg per kilogram of the polymer.

EXAMPLE 12

Addition of the hydrosilane Compound (B) Having a Crosslinkable silyl Group to the alkenyl-Containing (meth)acrylic polymer (A): Using platinum Catalyst (5 mg in Terms of platinum Metal Per Kilogram of the polymer)

Methyl orthoformate (1 molar equivalent per alkenyl group), a platinum catalyst (5 mg in terms of platinum metal per kilogram of the polymer), and methyldimethoxysilane (3 molar equivalents per alkenyl group) were supplied in that order to the polymer obtained by the post-treatment (Steps 1 and 2) of SYNTHETIC EXAMPLE 6. The resulting mixture was stirred under heating at 100° C. for 1 hour in a nitrogen atmosphere. Disappearance of the alkenyl groups by the reaction was confirmed by $^1$H-NMR. The reaction mixture was then concentrated to obtain a target polymer containing methoxysilyl groups. This polymer had a number-average molecular weight of 17,800 and a molecular weight distribution of 1.17. The number of silyl groups introduced per polymer molecule was 1.9.

SYNTHETIC EXAMPLES, EXAMPLES, and COMPARATIVE EXAMPLES above are summarized in the table below.

|  | Alkenyl-containing polymer | | | Hydrosilylation | | |
| --- | --- | --- | --- | --- | --- | --- |
|  | Cu content (mg) | Br content (mg) | Purification method[1)] | Pt content (mg) | Number of silyl groups | Others |
| SYNTHETIC EXAMPLE 1 | (7) | (280) | Purification method 1 | — | — | — |
| EXAMPLE 1 | 7 | 280 |  | 30 | 1.8 |  |
| COMPARATIVE EXAMPLE 1 | 7 | 990 |  | 30 |  | Alkenyl groups remained |
| SYNTHETIC EXAMPLE 2 | (2 or less) | (260 or less) | Purification method 2 | — | — | — |
| EXAMPLE 2 | 2 or less | 260 or less |  | 10 | 1.9 |  |
| COMPARATIVE EXAMPLE 2 | 16 | 260 |  | 10 |  | Alkenyl groups did not react |
| SYNTHETIC EXAMPLE 3 | (6 or less) | (240) | Purification method 2 | — | — |  |
| EXAMPLE 3 | 6 or less | 240 |  | 10 | 1.8 |  |
| EXAMPLE 4 | 6 or less | 240 |  | 30 | 1.8 |  |
| EXAMPLE 5 | 6 or less | 240 |  | 30 | 1.8 |  |
| EXAMPLE 6 | 6 or less | 240 |  | 5 | 1.6 |  |
| COMPARATIVE EXAMPLE 3 | 6 or less | 240 |  | 0 | (0) | Alkenyl groups did not react |
| SYNTHETIC EXAMPLE 4 | (3) | (280) | Purification method 2 | — | — |  |
| EXAMPLE 7 | 2 or less | 280 |  | 10 | 1.8 |  |
| EXAMPLE 8 | 2 or less | 280 |  | 5 | 1.9 |  |
| EXAMPLE 9 | 2 or less | 280 |  | 1 | 1.9 |  |
| EXAMPLE 10 | 2 or less | 280 |  | 40 | 1.8 | Strongly colored |

-continued

|  | Alkenyl-containing polymer | | | Hydrosilylation | | |
| --- | --- | --- | --- | --- | --- | --- |
|  | Cu content (mg) | Br content (mg) | Purification method[1)] | Pt content (mg) | Number of silyl groups | Others |
| COMPARATIVE EXAMPLE 4 | 2 or less | 280 |  | 0 | (0) | Alkenyl groups did not react |
| SYNTHETIC EXAMPLE 5 | (2 or less) | (170) | Purification method 3 |  |  |  |
| EXAMPLE 11 | 2 or less | 170 |  | 10 | 1.9 |  |
| SYNTHETIC EXAMPLE 6 | (2 or less) | (290) | Purification method 3 |  |  |  |
| EXAMPLE 12 | 2 or less | 290 |  | 5 | 1.9 |  |

1) Purification Method 1: Centrifugal Separation, Adsorption, Removal of Solid Components, Heating, and Removal of Solid Components.

Purification method 2: centrifugal separation, adsorption, removal of solid components, heating, adsorption, and removal of solid components.

Purification method 3: adsorption, removal of solid components, heating, adsorption, and removal of solid components.

INDUSTRIAL APPLICABILITY

According to the present invention, by restraining the amounts of an expensive platinum hydrosilylation catalyst, a (meth)acrylic polymer having terminal crosslinkable silyl groups can be cost-effectively produced from an alkenyl-terminated (meth)acrylic polymer (A) prepared by ATRP. The (meth)acrylic polymer having terminal crosslinkable silyl groups made according to the present invention contains small amounts of coloring components.

The invention claimed is:

1. A method for producing a (meth)acrylic polymer having crosslinkable silyl groups at the termini, comprising the steps of:
   (i) preparing (A) an alkenyl-terminated (meth)acrylic polymer containing halogen groups by atom transfer radical polymerization;
   (ii) heating the alkenyl-terminated (meth)acrylic polymer to a temperature in the range of 170° C. to 250° C. without an adsorbent to remove said halogen groups from the alkenyl-terminated (meth)acrylic polymer;
   (iii) separating insoluble components contained in the dehalogenated alkenyl-terminated (meth)acrylic polymer; and
   (iv) mixing the alkenyl-terminated (meth)acrylic polymer (A) obtained by steps (i) to (iii), having 10 mg or less of a transition metal per kilogram of the polymer (A) and 500 mg or less of a halogen per kilogram of the polymer (A), a hydrosilane compound having a crosslinkable silyl group (B), and a platinum catalyst (C) to carry out hydrosilylation reaction.

2. The method according to claim 1, wherein the polymer (A) contains 3 mg or less of the transition metal per kilogram of the polymer (A).

3. The method according to claim 1, wherein the polymer (A) contains 300 mg or less of the halogen per kilogram of the polymer (A).

4. The method according to claim 1, wherein the amount of the platinum catalyst (C) used is 0.1 mg to 30 mg on a platinum metal basis per kilogram of the polymer (A).

5. The method according to claim 1, wherein the amount of the platinum catalyst (C) used is 0.5 mg to 10 mg on a platinum metal basis per kilogram of the polymer (A).

6. The method according to claim 1, wherein the hydrosilylation is carried out in the presence of a hydrolyzable ester compound and/or an alkyl alcohol.

7. The method according to claim 6, wherein the hydrolyzable ester compound is trialkyl orthoformate.

8. The method according to claim 1, wherein the hydrosilylation is carried out in an inert gas atmosphere.

9. The method according to claim 8, wherein the inert gas is nitrogen gas.

10. The method according to claim 1, wherein the hydrosilylation is carried out at a temperature in the range of 50° C. to 150° C.

11. The method according to claim 1, wherein the hydrosilylation is carried out at a temperature in the range of 70° C. to 120° C.

12. The method according to claim 1, wherein the hydrosilane compound (B) having a crosslinkable silyl group is added in portions.

13. The method according to claim 1, wherein the hydrosilane compound (B) having a crosslinkable silyl group is methyldimethoxysilane.

14. The method according to claim 1, wherein the platinum catalyst (C) is a platinum(0)-1,1,3,3-tetramethyl-1,3-divinyl-disiloxane complex.

15. The method according to claim 1, wherein the polymer (A) is prepared by the following steps (1) to (3):
   (1) polymerizing a (meth)acrylic monomer in the presence of a transition metal complex functioning as a catalyst and one of an organohalide compound and a sulfonyl halide compound functioning as an initiator, thereby producing a halogen-terminated (meth)acrylic polymer;
   (2) reacting the halogen group with a compound having a plurality of alkenyl groups in the molecule; and
   (3) carrying out dehalogenation reaction by heating.

16. The method according to claim 1, wherein the halogen is selected from the group consisting of chlorine, bromine, and iodine.

17. The method according to claim 1, wherein the (meth)acrylic polymer is a (meth)acrylic ester polymer.

18. The method according to claim 1, wherein the (meth)acrylic polymer is an acrylic ester polymer.

19. The method according to claim 15, wherein the compound having a plurality of alkenyl groups in the molecule is a nonconjugated diene compound.

20. The method according to claim 15, wherein the compound having a plurality of alkenyl groups in the molecule is an alkenyl-containing aliphatic hydrocarbon compound.

21. The method according to claim 15, wherein the compound having a plurality of alkenyl groups in the molecule is 1,7-octadiene.

22. The method according to claim 1, wherein the polymer (A) is obtained by processing 100 kg or more of a polymer at a time.

* * * * *